(12) United States Patent
Samain

(10) Patent No.: US 7,841,662 B2
(45) Date of Patent: Nov. 30, 2010

(54) SUPPORT ASSEMBLY AND CORRESPONDING SEAT STRUCTURE

(75) Inventor: Maxime Samain, Izegem (BE)

(73) Assignee: L&P Swiss Holding Company, Wittenbach (CH)

( * ) Notice: Subject to any disclaimer, the term of this patent is extended or adjusted under 35 U.S.C. 154(b) by 9 days.

(21) Appl. No.: 11/936,498

(22) Filed: Nov. 7, 2007

(65) Prior Publication Data

US 2009/0115234 A1  May 7, 2009

(51) Int. Cl.
*A47C 7/46* (2006.01)
(52) U.S. Cl. ................... 297/284.4; 297/284.7
(58) Field of Classification Search .............. 297/284.1, 297/284.7, 284.4
See application file for complete search history.

(56) References Cited

U.S. PATENT DOCUMENTS

| | | | | |
|---|---|---|---|---|
| 4,368,793 | A  * | 1/1983 | Igarashi | 180/14.4 |
| 5,016,490 | A | 5/1991 | Jaksic | |
| 5,555,769 | A | 9/1996 | Lichtenberg | |
| 6,814,407 | B2 * | 11/2004 | Mundell | 297/284.4 |
| 6,880,886 | B2 * | 4/2005 | Bodnar et al. | 297/285 |
| 6,971,719 | B2 * | 12/2005 | Liu et al. | 297/284.4 |
| 7,083,233 | B2 * | 8/2006 | Massara et al. | 297/284.4 |
| 2004/0245824 | A1* | 12/2004 | McMillen | 297/284.4 |
| 2006/0226683 | A1 | 10/2006 | Massara et al. | |

FOREIGN PATENT DOCUMENTS

| | | |
|---|---|---|
| DE | 19609255 C1 | 8/1997 |
| DE | 10114521 A1 | 9/2002 |
| EP | 0552904 B1 | 7/1993 |
| EP | 0874575 B1 | 11/1998 |
| EP | 1406023 A | 4/2004 |
| GB | 2342286 A | 4/2000 |
| WO | WO 94/00039 | 1/1994 |
| WO | 03/034871 A1 | 5/2003 |

OTHER PUBLICATIONS

PCT International Search Report for PCT/EP2008/000429.

\* cited by examiner

*Primary Examiner*—David Dunn
*Assistant Examiner*—Erika Garrett
(74) *Attorney, Agent, or Firm*—Grant D. Kang; Kang Intellectual Property Law, LLC

(57) ABSTRACT

A support assembly having a first support region with adjustable degree of support and a second support region with adjustable degree of support for use in a seat structure is provided. The support assembly comprises a support member for incorporation into a seat frame, a first adjustment arrangement for adjusting the degree of support in the first support region, and a second adjustment arrangement for adjusting the degree of support in the second support region. The support assembly further comprises an actuator coupled to the first adjustment arrangement and to the second adjustment arrangement), the actuator being configured to simultaneously act on the first adjustment arrangement and on the second adjustment arrangement in opposite directions.

22 Claims, 16 Drawing Sheets

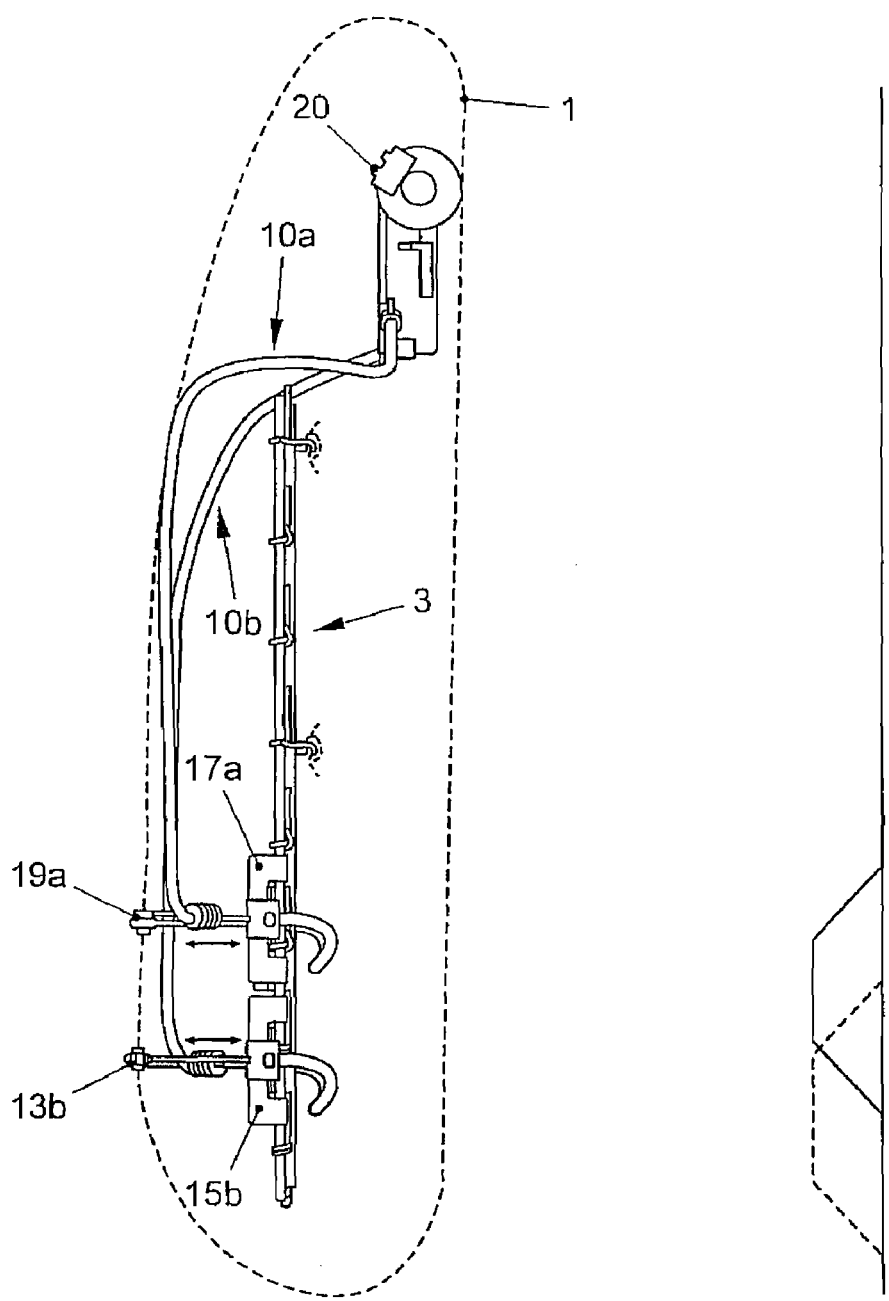
FIG. 2a
FIG. 2b
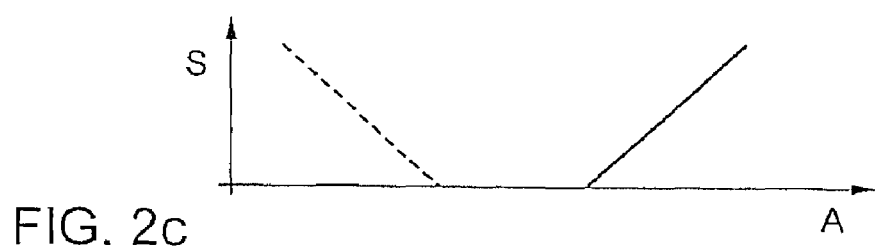
FIG. 2c

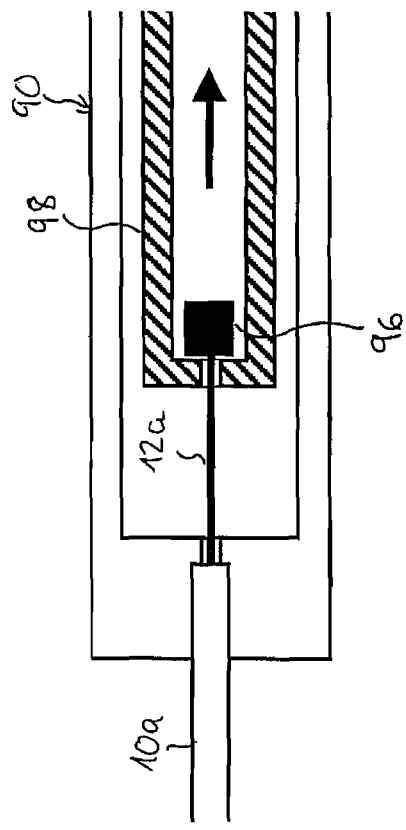
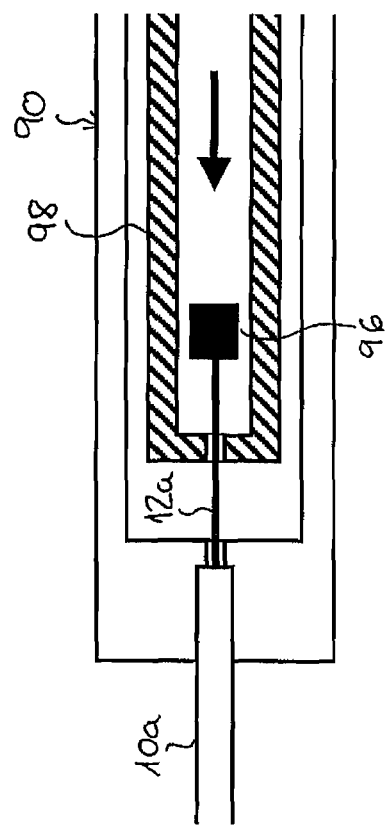
FIG. 14

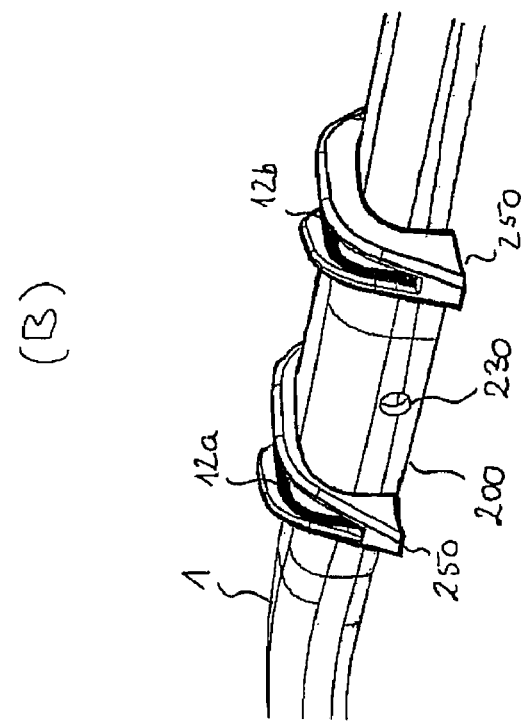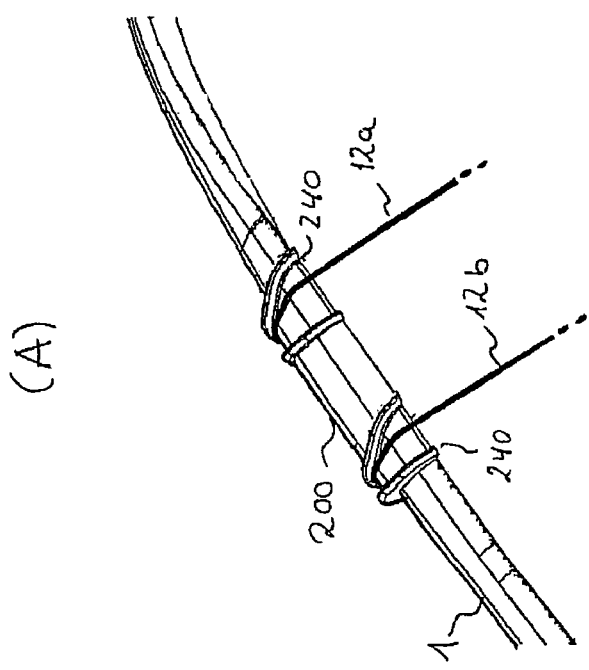
FIG. 16

SUPPORT ASSEMBLY AND CORRESPONDING SEAT STRUCTURE

CROSS-REFERENCE TO RELATED APPLICATIONS

None

STATEMENT REGARDING FEDERALLY SPONSORED RESEARCH

Not Applicable.

BACKGROUND OF THE INVENTION

1. Field of the Invention

The present invention relates to a support assembly, and in particular to a support assembly for incorporation into a seat frame in order to provide a seat structure with an adjustable degree of support in two different regions, e.g. a lumbar region and a pelvis region. More specifically, the present invention relates to a support assembly comprising a support member for providing load bearing support for upholstery of a seat.

2. Related Art

Support assemblies of the aforementioned kind are very well known and may have various configurations determined by the design of a seat in which the support assembly is to be mounted (see, e.g., WO 95/00039 A).

EP 0 874 575 B1 proposes a support assembly for incorporation into a seat frame, the support assembly comprises a wire framework having two lateral side wires suspendable in the seat frame and a plurality of transverse wires providing load bearing support for upholstery of the respective seat and extending between the lateral side wires.

SUMMARY OF THE INVENTION

Support assemblies of the aforementioned kind are incorporated in a seat frame of a back rest in order to support the lumbar region of a person sitting on the respective seat. When using a support assembly having a wire framework of the kind described above, this can be accomplished by pulling the two lateral side wires of the wire framework towards the front of the back rest of the seat. For example, EP 0 552 904 A1 discloses such a lumbar support assembly comprising a support member in the form of a platform element, which is suspended by tension springs in a seat frame to support the cushioning of a back rest. The support member has two lateral side wires and a plurality of transverse wires, and two adjustment arrangements comprising Bowden cables are linked between respective portions of the lateral side wires to apply a force of longitudinal compression, whereby the side wires are caused to be hinged outwardly at an articulation point to vary the degree of lumbar support provided by the transverse wires.

Since the two sides of the support member of the support assembly should be displaced by the same amount at the same time for achieving a symmetric support feeling, it is necessary to shorten the extension of both Bowden cables by a respective actuator mechanism simultaneously, which however is difficult to achieve and requires two separate Bowden cables.

Further, it is known to provide lumbar support assemblies not only with an adjustable degree of support, but also with an adjustable height, which means that a vertical position of the region in which the support is provided can be adjusted. For this purpose, it is typically required to have one mechanism for adjusting the degree of support and a further mechanism for adjusting the height. Moreover, it is necessary to have two separate actuators for independently adjusting the height and the degree of support.

From GB 2 342 286 A, a support assembly is known which comprises a support member to be suspended in a seat frame and adjustable link means for varying the effective profile of the support. In particular, a plurality of the adjustable link means is provided which are spaced apart in a vertical direction of the seat frame, which allows for adjusting the degree of support in vertically different regions of the support member. Also in this case, two separate adjustment arrangements or adjustment mechanisms comprising Bowden cables and an actuator are required for each of the different support regions.

In the above-known support assemblies, there exists therefore a problem as to a large number of components which have to be used for achieving a symmetric adjustable support in different regions. This increases costs of the seat, and may also result in problems as to accommodating the various components within the seat structure.

Therefore, the object underlying the present invention is to provide a support assembly in which it is possible to choose between different heights for a region of support, which has a simplified structure as compared to the solutions known from the prior art, and in which an adjustable support functionality and, in particular, a symmetric support feeling can be realized in different regions with only few components and at low cost.

The support assembly of the present invention comprises a support member for incorporation into a seat frame. The support member may be a wire framework having as side members two lateral side wires and a plurality of transverse wires as transverse members which extend between the two side members. The support member is preferably adapted to be suspended in a seat frame.

Furthermore, the support assembly of the present invention has a first support region with an adjustable degree of support and a second support region with an adjustable degree of support. The first support region and the second support region are preferably located at different heights of the support assembly, for example in the lumbar region and in the pelvis region or in a lumbar region of a large person and in the lumbar region of a small person.

The support assembly of the present invention comprises a first adjustment arrangement or adjustment mechanism for adjusting the degree of support in the first support region and a second adjustment arrangement or adjustment mechanism for adjusting the degree of support in the second support region. According to the invention, an actuator is coupled to the first adjustment arrangement and to the second adjustment arrangement and is configured to simultaneously act on the first adjustment arrangement and on the second adjustment arrangement in opposite directions, i.e. to increase the tension in one of the adjustment arrangements while decreasing the tension in the other adjustment arrangement and vice versa.

According to the above structure of the support assembly according to the present invention, it is possible to increase the degree of support in the first support region by operating the actuator in a first direction and to simultaneously decrease the degree of support in the second support region. Conversely, by operating the actuator in a second direction, it is possible to decrease the degree of support in the first support region and to increase the degree of support in the second support region. Thereby, it is possible to select between different positions for the support, and to adjust the degree of support in each of the different regions. Still, there is only one actuator required to achieve these different possibilities of adjustment. Consequently, a simple structure is provided for the support assembly and the support assembly can be realized at low cost.

The first and second adjustment arrangements or adjustment mechanisms, in principle, can be of any kind such that they allow to transfer an adjustment force from the actuator to the first and second support regions, respectively. According to an embodiment, the first and second adjustment mechanisms may comprise at least one connecting member that is coupled between the actuator and the first support region and the second support region, respectively. These connecting members may consist of a wire, a cable, a belt or any other connecting means that allows to transfer an adjustment force from the actuator to the first support region and the second support region, respectively.

DETAILED DESCRIPTION OF THE PREFERRED EMBODIMENTS

According to a further embodiment of the invention, the first and second adjustment arrangements comprise a tensioning mechanism that allows to transfer a tensioning force from the actuator to the first support region and the second support region, respectively, of the support assembly.

In accordance with a preferred embodiment, the first adjustment arrangement and/or the second adjustment arrangement comprise a Bowden cable arrangement, the Bowden cable arrangement comprising a wire being movably or slidably guided within a sheath. In the following, the invention will be described in more detail with reference to this preferred embodiment using first and second Bowden cable arrangements, although it is to be understood that the present invention is not restricted to this particular embodiment.

Preferably, the support assembly comprises first attachment means for attaching a sheath of the first Bowden cable arrangement to one side of the support member in the first support region, second attachment means for attaching the sheath of the first Bowden cable arrangement to the opposite side of the support member in the first support region, third attachment means for attaching a sheath of the second Bowden cable arrangement to one side of the support member in the second support region, and fourth attachment means for attaching the sheath of the second Bowden cable arrangement to the opposite side of the support member in the second support region, a first end portion of the wire of the first Bowden cable arrangement extending from the first attachment means and being adapted to be connected to the seat frame, and a first end portion of the wire of the second Bowden cable arrangement extending from the third attachment means and being adapted to be connected to the seat frame. With this structure, when the support assembly is suspended in a seat frame, the degree of support can be adjusted in each of the support regions and by moving the support member with respect to the seat frame due to an increased or decreased length of the wire extending from the attachment means.

The first attachment means and the fourth attachment means can be located on the same side of the support member. In this case, also the second attachment means and the third attachment means are located on the same side of the support member, opposite to the first attachment means and the fourth attachment means. Alternatively, it could also be possible to locate the first attachment means and the third attachment means on the same side of the support member, which means that also the second attachment means and the fourth attachment means would be located on the same side of the support member, but opposite to the first and third attachment means.

By means of these different locations for the attachment means, the support assembly can be easily adapted to different locations for accommodating the actuator. Those of the attachment means which are located on the same side of the support member can be integrally formed, which simplifies the structure of the support assembly.

According to a preferred embodiment, the sheath of the first Bowden cable arrangement and the sheath of the second Bowden cable arrangement each comprise a first portion and a second portion which are separated from each other. For the first Bowden cable arrangement, the first portion of the sheath extends from the actuator to a first frame attachment means for attaching the first portion of the sheath to the seat frame, and the second portion of the sheath extends from the first attachment means to the second attachment means. For the second Bowden cable arrangement, the first portion of the sheath extends from the actuator to a second frame attachment means for attaching the first portion of the sheath to the seat frame, and the second portion of the sheath extends from the third attachment means to the fourth attachment means. With such a configuration, it is possible to symmetrically act on both sides of the support member in the two support regions by using only two single Bowden cables, each for one of the different support regions.

Also according to a further preferred embodiment, the sheath of the first Bowden cable arrangement and the sheath of the second Bowden cable arrangement each comprise a first portion and a second portion which are separated from each other. According to this embodiment, the first attachment means and the third attachment means are located on opposite sides of the support member. For the first Bowden cable arrangement, the first portion of the sheath extends from the first attachment means to the actuator and the second portion of the sheath extends from the actuator to the second attachment means. For the second Bowden cable arrangement, the first portion of the sheath extends from the third attachment means to the actuator and the second portion of the sheath extends from the actuator to the fourth attachment means. A second end portion of the wire of the first Bowden cable arrangement extends from the second attachment means, and a second end portion of the wire of the second Bowden cable arrangement extends from the fourth attachment means. Also in this structure, it is possible to symmetrically act on the two sides of the support member in each of the support regions by using only a single Bowden cable for each of the support regions.

In the above embodiment, a preferred actuator comprises a slide member which is slidably connected to a fixed member of the actuator, the first portion of the sheath of the first Bowden cable arrangement and the first portion of the sheath of the second Bowden cable arrangement being coupled to the slide member and the second portion of the sheath of the first Bowden cable arrangement and the second portion of the sheath of the second Bowden cable arrangement being coupled to the fixed member. In this structure, by moving the slide member in one direction the tension in the first Bowden cable arrangement is increased and the tension in the second Bowden cable arrangement is decreased, and by moving the slide member in a second direction the tension in the first Bowden cable arrangement is decreased and the tension in the second Bowden cable arrangement is increased. The actuator preferably comprises means for moving the slide member, e.g. a toothed wheel which is engaged with a toothed surface of the slide member.

Another type of actuator which can be used in connection with the present invention comprises winding means for winding a wire of the first Bowden cable arrangement and the wire of the second Bowden cable arrangement in opposite directions. This means that when the wire of the first Bowden cable arrangement is wound, the wire of the second Bowden cable arrangement is unwound and vice versa.

According to the present invention, both manual-driven and motor-driven actuators may be used.

Further, it is preferred that an unsheathed portion of the wire of the first Bowden cable arrangement and/or an unsheathed portion of the wire of the second Bowden cable arrangement is covered with a plastic material. By this means, it is avoided that unsheathed portions of the wires generate noise in a situation that there is low tension on the respective Bowden cable and movement of the wire becomes possible.

According to an embodiment, the support assembly further comprises a wire-length control mechanism coupled to the first and/or second Bowden cable arrangement, for absorbing an excessive length of the Bowden cable wire when there is low or even no tension on the Bowden cable arrangement.

The support assembly of the present invention is preferably incorporated into a seat frame of a seat structure, e.g. for forming a vehicle seat.

The support assembly of the present invention can be realized with different types of support members, e.g. wire frameworks, plate type support members, or support members having belts formed of a plastic material.

In the following, preferred embodiments of the present invention will be explained in detail with reference to the attached drawings.

BRIEF DESCRIPTION OF THE DRAWINGS

FIG. 2(a) shows a side view of the support assembly of FIG. 1, FIG. 2(b) schematically illustrates different support profiles of the support assembly, FIG. 2(c) illustrates the degree of support in a first support region and in a second support region as a function of actuator position.

FIGS. 14(A) and (B) schematically illustrate a wire-length control mechanism according to a further embodiment of the invention.

FIGS. 16(A) and (B) schematically illustrate a connecting structure for connecting a wire end of a Bowden cable arrangement to a seat frame, according to an embodiment of the invention.

FIG. 1 shows a support assembly according to a first embodiment of the present invention, the support assembly being configured to be incorporated or suspended in a seat frame of a back rest of a seat. The support assembly is configured to provide load bearing support for upholstery or cushioning of the seat by means of a support member 3. In the present embodiment, the support member is formed as a wire framework. It comprises a pair of side wires 4 forming two elongate side members and a plurality of transverse wires 6 as transverse members extending between the two side members. The transverse wires 6 are anchored to the side wires 4. According to the embodiment shown in FIG. 1, the transverse wires 6 are anchored to the side wires 4 by being wound around the latter. Intermediate portions of the transverse wires 6 are angled in the support plane so that the support member 3 becomes extensible under loading placed upon the support arrangement.

The side wires 4 may be formed by synthetic plastic covered paper-wrapped steel cords and form two generally vertical lateral rails. The transverse wires 6 extending between the two side wires 4 penetrate and intermediate vertical cord 5 of paper or synthetic plastic material which serves to provide some degree of stability to the wire framework comprising the two side wires 4 and the transverse wires 6 and maintains a predetermined vertical spacing between the transverse wires 6. Alternatively, the side members may comprise formed wires of a plastic material.

Figure 1:
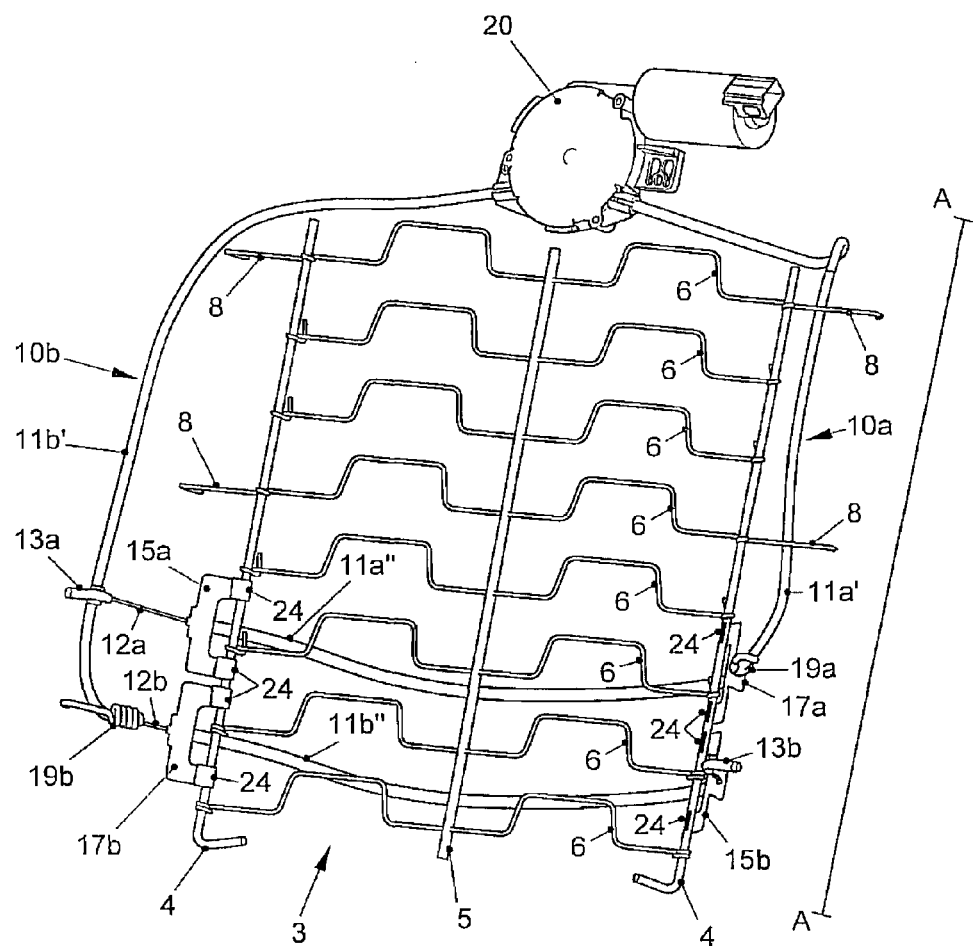
FIG. 1 shows a perspective view of a support assembly according to a first embodiment of the present invention.

As shown in FIG. 1, the lower ends of the side wires 4 are angled so as to allow the incorporation of the support member 3 into the seat frame. The support member 3 can be suspended in the seat frame by means of tension springs anchored between the seat frame and the lower ends of the side wires 4 and some of the transverse wires 6, respectively.

As can be taken from FIG. 1, some of the transverse wires 6 extend laterally beyond the side wires 4 after having been wound around the latter and terminate in free ends 8. Some of these free ends 8 are formed into hook-like fingers which may extend in the support plane or may also be directed backwards or in any other suitable direction which allows to anchor a tension spring to the respective hook-like fingers. The fact that the extended portions 8 of the transverse wires 6 terminate in free ends enables more versatile lateral support to be provided, particularly in the lumbar region of a back rest. In particular, the hook-like fingers of the free ends 8 can be individually angled, if desired, to conform to the contour of the back rest. If the laterally extending free ends 8 are unconnected with respect to the seat frame, an effective adjustable lumbar support can be provided by arching the two side wires 4 in the lumbar region or in the pelvis region of the support member 3, as the free ends 8 can provide laterally contoured support without interfering with the arching of the two side wires 4.

If desired, the two side wires 4 may be angled to provide regions of the support member 3 which have different transverse widths between the side wires 4.

The support assembly comprises adjustment means for adjustably arching the side wires 4 in two vertically different regions of the support assembly. These adjustment means comprise an actuator 20, which in the present embodiment is electrically driven.

The support assembly comprises a first Bowden cable arrangement 10a for adjusting the degree of support in a first support region, e.g. in the lumbar region of a seat back rest. A second Bowden cable arrangement 10b is provided for adjusting the degree of support in a second support region below the first support region, e.g. in a pelvis region of the seat back rest. The first support region may also correspond to a lumbar region of a large person, while the second support region corresponds to a lumbar region of a small person, thereby allowing for the support characteristics to be adapted to different sizes of a seat occupant.

The first Bowden cable arrangement 10a and the second Bowden cable arrangement 10b each comprise an inner wire 12a, 12b and an outer sheath 11a', 11a", 11b', 11b" for guiding the wire 12a, 12b.

The support assembly comprises first attachment means 15a for attaching the sheath 11a', 11a" of the first Bowden cable arrangement 10a to a first side of the support member 3. Second attachment means 17a are provided for attaching the sheath 11a', 11a" of the first Bowden cable arrangement to a second side of the support member 3, opposite to the first side.

A first end portion 13a of the wire 12a of the first Bowden cable arrangement 10a extends from the first attachment means 15a and is adapted to be connected to the seat frame. In particular, the first end portion of the wire 12a is provided with a connecting means having the shape of a Z-nipple. From the second attachment means 17a, the first Bowden cable arrangement 10a extends to the actuator 20. A first frame attachment means 19a is provided at the side of the second attachment means 17a for attaching the sheath 11a', 11a" of the first Bowden cable arrangement 10a to the seat frame.

As illustrated in FIG. 1, the sheath 11a', 11a" of the first Bowden cable arrangement 10a comprises a first portion 11a' extending between the actuator 20 and the first frame attachment means 19a and a second portion 11a" extending between the first attachment means 15a and the second attachment means 17a. The first portion 11a' and the second portion 11a" are separated from each other, i.e. only the wire 12a of the first Bowden cable arrangement 10a extends between the second attachment means 17a and the first frame attachment means 19a.

The first frame attachment means 19a is provided with a hook-like extension for connecting to the seat frame.

As can be seen, the portions of the wire 12a of the first Bowden cable arrangement 10a extending from the first attachment means 15a and the second attachment means 17a can be symmetrically shortened by increasing the tension in the first Bowden cable arrangement 10a, thereby pulling the support member 3 towards the seat frame.

Similarly, the support assembly comprises a third attachment means 15b for attaching the sheath 11b', 11b" of the second Bowden cable arrangement 10b to the second side of the support member 3. A fourth attachment means 17b is provided for attaching the sheath 11b', 11b" of the first Bowden cable arrangement to the first side of the support member 3.

A first end portion 13b of the wire 12b of the second Bowden cable arrangement 10b extends from the third attachment means 15b and is adapted to be connected to the seat frame. In particular, the first end portion of the wire 12b is provided with a connecting means having the shape of a Z-nipple. From the fourth attachment means 17b, the second Bowden cable arrangement 10b extends to the actuator 20. A second frame attachment means 19b is provided at the side of the fourth attachment means 17b for attaching the outer sheath 11b', 11b" of the second Bowden cable arrangement 10b to the seat frame.

As illustrated in FIG. 1, the sheath 11b', 11b" of the second Bowden cable arrangement 10b comprises a first portion 11b' extending between the actuator 20 and the second frame attachment means 19b and a second portion 11b" extending between the third attachment means 15b and the fourth attachment means 17b. The first portion 11b' and the second portion 11b" are separated from each other, i.e. only the wire 12b of the second Bowden cable arrangement 10b extends between the fourth attachment means 17b and the second frame attachment means 19b.

The second frame attachment means 19b is provided with a hook-like extension for connecting to the seat frame.

As can be seen, the portions of the wire 12b of the second Bowden cable arrangement 10b extending from the third attachment means 15b and the fourth attachment means 17b can be symmetrically shortened by increasing the tension in the second Bowden cable arrangement 10b, thereby pulling the support member 3 towards the seat frame.

In the embodiment of FIG. 1, the second end portions of the wires 12a, 12b of the first and second Bowden cable arrangements are coupled to the actuator 20, which is configured to simultaneously act on the first Bowden cable arrangement 10a and the second Bowden cable arrangement 10b in opposite directions. This means that when the tension in the first Bowden cable arrangement 10a is increased, the tension in the second Bowden cable arrangement 10b is decreased and vice versa. Accordingly, the degree of support in the first support region is increased while the degree of support in the second region is decreased and vice versa. A user can select between two different heights for the support, and the degree of support can be adjusted in each of the support regions. Still only one actuator and only a single Bowden cable for each of the support regions is required.

As illustrated in FIG. 1, the first attachment means 15a, the second attachment means 17a, the third attachment means 15b, and the fourth attachment means 17b are formed as plate clips which can be clipped onto the respective side wire 4 of the support member 3 so as to attach the sheath of the Bowden cable arrangement to the respective side of the support member 3. In each case, the plate clip has two end portions 24 which are formed like a resilient or flexible hook or clip so that these end portions 24 can be easily clipped onto the respective side wire 4. Each of the plate clips has a hole through which the wire 12a, 12b of the respective Bowden cable arrangement 10a, 10b extends.

The first frame attachment means 19a is formed as a spring which is wound around an end portion of the first portion 11a' of the sheath of the first Bowden cable arrangement 10a. From the spring there extends the hook-like extension for connecting the first frame attachment means 19a to the seat frame. Similarly, the second frame attachment means 19b is formed as a spring wound around an end portion of the first portion 11b' of the sheath of the second Bowden cable arrangement 10b, and, the extension which has a hook-like shape for connecting to the seat frame extending therefrom. These hook-like extensions of the frame attachment means 19a, 19b as well as the Z-nipples and the first end portions of the wires 12a, 12b are inserted to corresponding receiving structures on the seat frame, which are preferably located near the front edge of the seat frame. Therefore, when increasing the tension in one of the Bowden cable arrangements 10a, 10b, the support member 3 is pulled towards the front edge of the seat frame in the corresponding support region and the degree of support is increased. If the tension in the Bowden cable arrangement 10a, 10b is decreased, the support member 3 will move back due to the resilient characteristics of the support member 3 itself and/or due to the elastic suspension of the support member 3 in the seat frame.

FIG. 2(a) shows a side view of the support assembly of FIG. 1. In FIG. 2(a), the seat frame is indicated by a dashed line denoted by 1. As can be seen, the first frame attachment means 19a and the first end portion 13b of the wire 12b are connected to the seat frame 1 near the front edge of the seat frame 1. By increasing the tension in the first Bowden cable assembly 10a, the support member 3 is moved towards the front edge of the seat frame 1, thereby increasing the degree of support. Simultaneously, the tension in the second Bowden cable arrangement 10b is decreased and the support member 3 moves backward from the front edge of the seat frame 1, thereby decreasing the degree of support. This is in FIG. 2(a) illustrated by arrows near the frame attachment means 19a and the first end portion 13b of the wire 12b. A similar configuration is provided on the opposite side of the support assembly.

FIG. 2(b) schematically illustrates support profiles provided by the support assembly as shown in FIG. 2(a). A solid line illustrates a maximum support configuration in the first support region. A dashed line illustrates a maximum support configuration in the second support region. By means of the actuator 20, it is possible to continuously change between the support configurations and to adjust the degree of support in each of the support regions.

FIG. 2(c) illustrates the degree of support S in the first support region and in the second support region as a function of actuator position A. The degree of support in the first support region is illustrated by a solid line and the degree of support in the second support region is illustrated by a dashed line. As can be seen, as the actuator position advances from left to right in FIG. 2(c), the degree of support in the second support region decreases from maximum to zero. After an intermediate region in which actually no increased support is provided in either support region, the degree of support in the first support region increases from zero to maximum. Of course the traces shown in FIGS. 2(b) and (c) are only schematic and it is possible to adapt the actual characteristics of the support assembly to specific requirements, for example by adjusting the tensions of the first Bowden cable arrangement 10a and a second Bowden cable arrangement 10b relative to each other.

Figure 3:
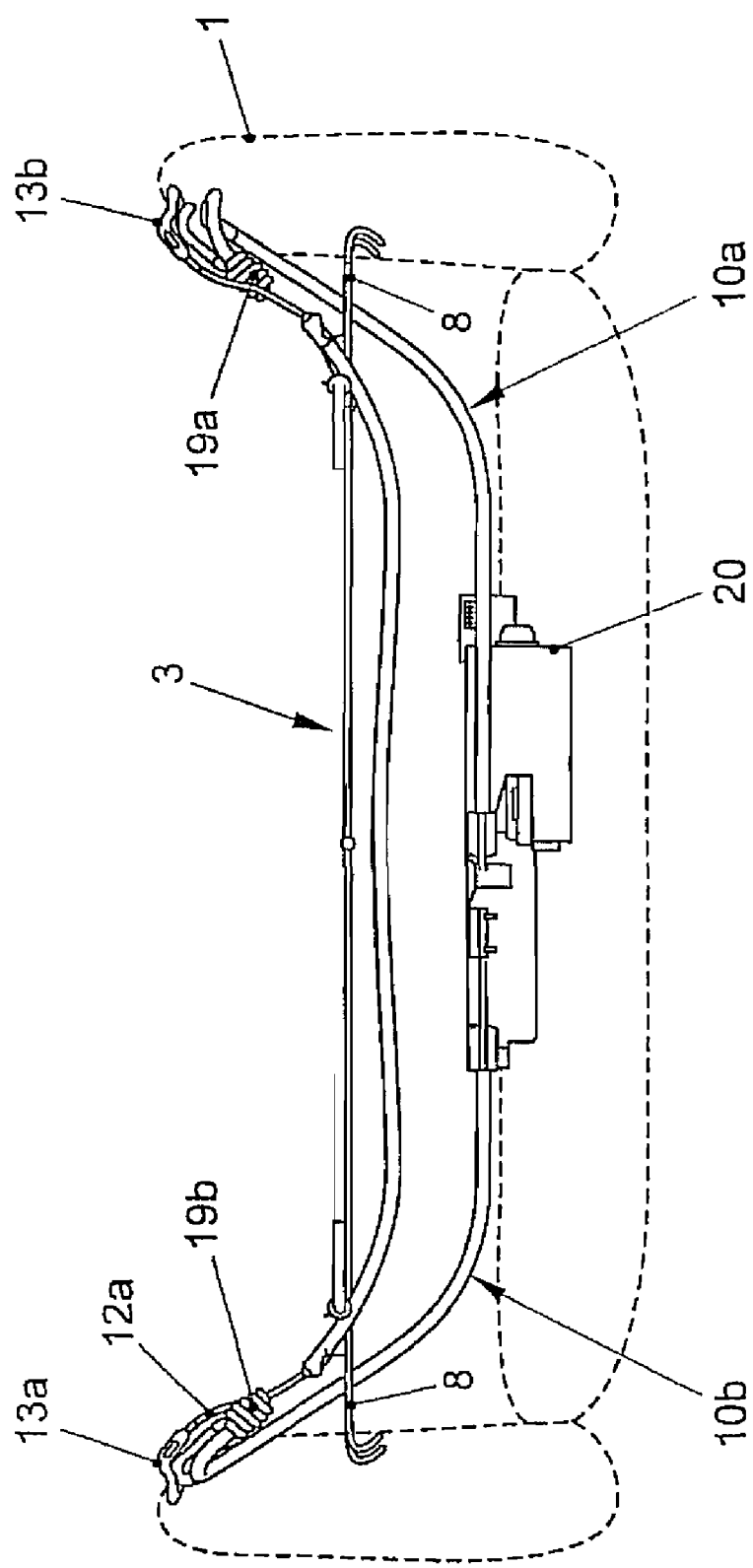
FIG. 3 shows a bottom view of the support assembly of FIG. 1.

FIG. 3 shows a bottom view of the support assembly as shown in FIG. 1. As can be seen, the actuator 20 can be easily accommodated in a rear region of the seat frame 1.

Figure 4:
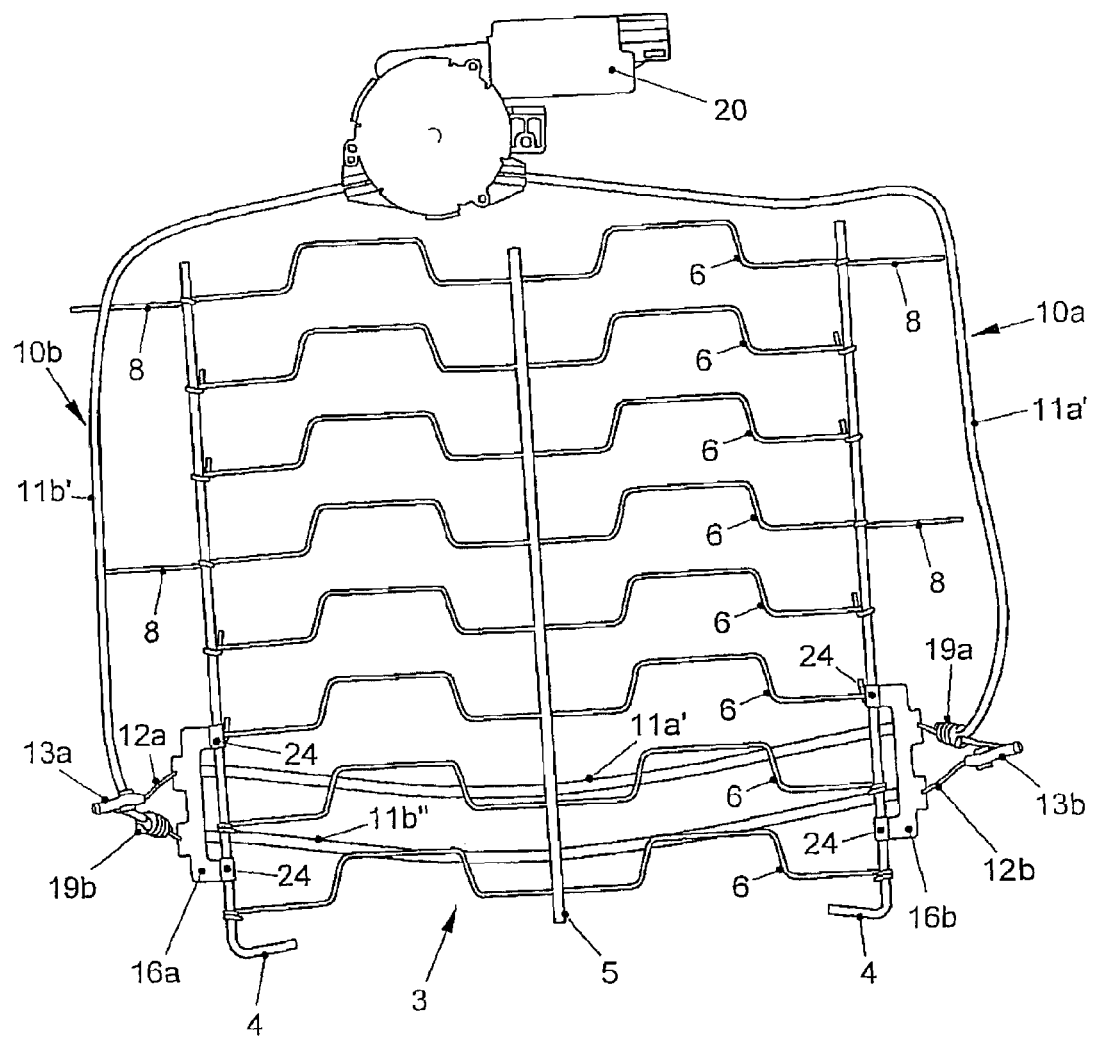
FIG. 4 shows a support assembly according to a second embodiment of the present invention, FIG. 5 schematically illustrates an actuator of the embodiments as shown in FIGS. 1-4.

FIG. 4 illustrates a second embodiment of the support assembly according to the present invention. The support assembly of FIG. 4 generally corresponds to that of FIGS. 1-3, and similar components have been designated by the same reference numerals. In the following, only the differences as compared to the support assembly of FIG. 1-3 will be explained.

In the support assembly of FIG. 4, the first attachment means 15a and the fourth attachment means 17b of the support assembly as shown in FIG. 1 have been integrated into a single plate clip 16a. Similarly, the second attachment means 17a and the third attachment means 15b have been integrated into a single plate clip 16b. As in the embodiment of FIGS. 1-3, the plate clips 16a and 16b are provided with two end portions 24 which are formed like a resilient or flexible hook or clip for attaching these end portions 24 to the respective side wire 4.

Further, a connecting portion of the first end portion 13a of the wire 12a of the first Bowden cable arrangement 10a is integrally connected with the second frame attachment means 19b. Similarly, a connecting portion of the first end portion 13b of the wire 12b of a second Bowden cable arrangement 10b is integrally connected with the first frame attachment means 19a. This can, for example, be achieved by forming a Z-nipple on the first end portion of the wires 12a, 12b from the same wire which is wound around the sheath 11a', 11b' of the Bowden cable arrangements 10a, 10b for forming the frame attachment means 19a, 19b. Further, it is possible to form the Z-nipple with a structure for receiving the sheath 11a', 11b' of the respective Bowden cable arrangement 10a', 10b'.

In the support assembly of FIG. 4, fewer components are required and therefore a simplified structure is achieved. Further, only one receiving structure is required on each side of the seat frame for connecting the first end portions 13a, 13b of the wires 12a, 12b and the sheaths 11a', 11b' of the Bowden cable arrangements 10a, 10b to the seat frame.

Figure 5:
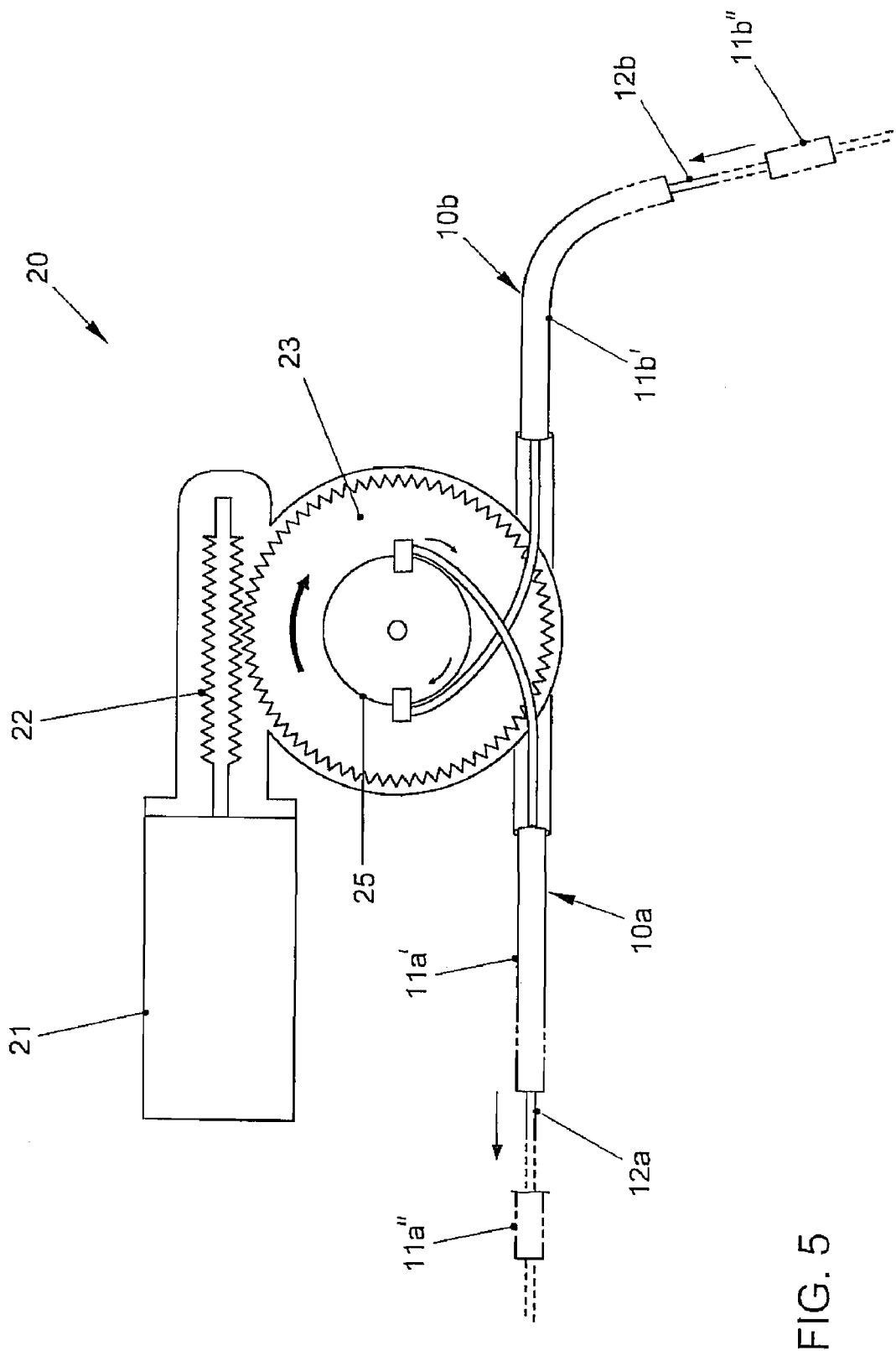

FIG. 5 schematically illustrates the actuator 20 of the support assemblies as shown in FIGS. 1-4. The actuator 20 comprises an electrically operated motor 21. A drive shaft of the motor 21 is provided with a worm 22 which is engaged with a toothed wheel 23. Accordingly, by operating the motor 21, the toothed wheel 23 is caused to rotate. On the toothed wheel 23 a winding means 25 is provided, to which the second end portion of the wire 12a of the first Bowden cable arrangement 10a and the second end portion of the wire 12b of the second Bowden cable arrangement 10b are coupled. As can be seen, the end portions of the wires 12a, 12b are coupled to the winding means 25 in such a manner that rotation of the winding means 25 in one direction causes the wire 12b of the first Bowden cable arrangement 10b to be wound while the wire 12a of the first Bowden cable arrangement 10a is caused to be unwound. Consequently, the tension in the first Bowden cable arrangement 10a is decreased and the tension in the second Bowden cable arrangement 10b is increased, as illustrated by the arrows. When the motor 21 is operated in the opposite direction, the wire 12a of the first Bowden cable arrangement 10a is wound while the wire 12b of the second Bowden cable arrangement 10b is unwound, thereby increasing the tension in the first Bowden cable arrangement 10a and decreasing the tension in the second Bowden cable arrangement 10b.

The worm gear formed of the worm 22 and the toothed wheel 23 provides the actuator 20 with a self-blocking capability, i.e. any torque applied to the toothed wheel 23 from the Bowden cable arrangements will not change the position of the actuator.

Figure 6:
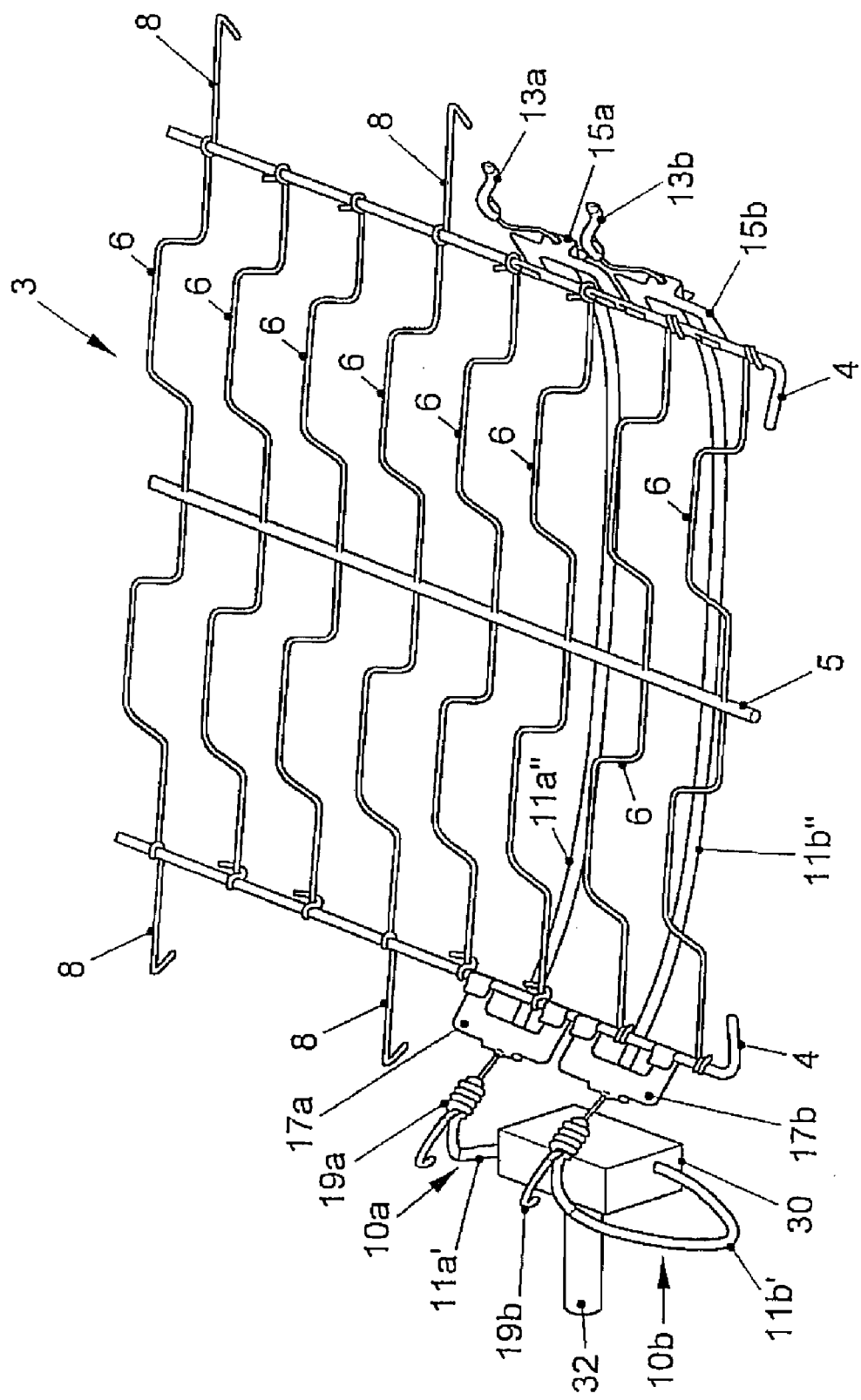
FIG. 6 shows a support assembly according to a third embodiment of the present invention.

FIG. 6 illustrates a support assembly according to a third embodiment. The embodiment of FIG. 6 generally corresponds to the support assembly as shown in FIGS. 1-3 and similar components have been designated with the same reference numerals. In the following, only the differences as compared to the support assembly of FIGS. 1-3 will be explained. While in the support assembly of FIGS. 1-3 the first attachment means 15a and the fourth attachment means 17b are located on the same side of the support member 3, in the support assembly of FIG. 6 the first attachment means 15a and the third attachment means 15b are located on the same side of the support member. Consequently, also the second attachment means 17a and the fourth attachment means 17b are located on the same side of the support member 3, but opposite to the first and third attachment means 15a, 15b. In particular, the first attachment means 15a and the third attachment means 15b are located on the second side of the support member 3 and the second attachment means 17a and the fourth attachment means 17b are located on the first side of the support member 3.

In the arrangement of FIG. 6, the connection from the actuator 30 to the support member 3 can be made from the same side. Therefore, if the actuator is located on the side of the seat structure as illustrated in FIG. 6, the length of the Bowden cable arrangements 10a, 10b can be reduced. This arrangement is particularly useful if the actuator 30 is a manual actuator which is typically located on the side of a seat structure so as to be easily accessible by a user. The actuator 30 shown in FIG. 6 is a manually operated actuator and comprises an actuating knob or shaft 32 for manual operation by the user. Of course, the support assembly as shown in FIG. 6 could also be provided with an electrically operated actuator.

Further, it would be possible to integrally form the first and third attachment means 15a, 15b and the second and fourth attachment means 17a, 17b. Moreover, the first frame attachment means 19a and the second frame attachment means 19b could be integrally formed, and the first end portions 13a, 13b of the wires 12a, 12b could be connected to a single connecting means, e.g. a Z-nipple. This arrangement would have characteristics similar to that of the second embodiment described with reference to FIG. 4.

Figure 7:
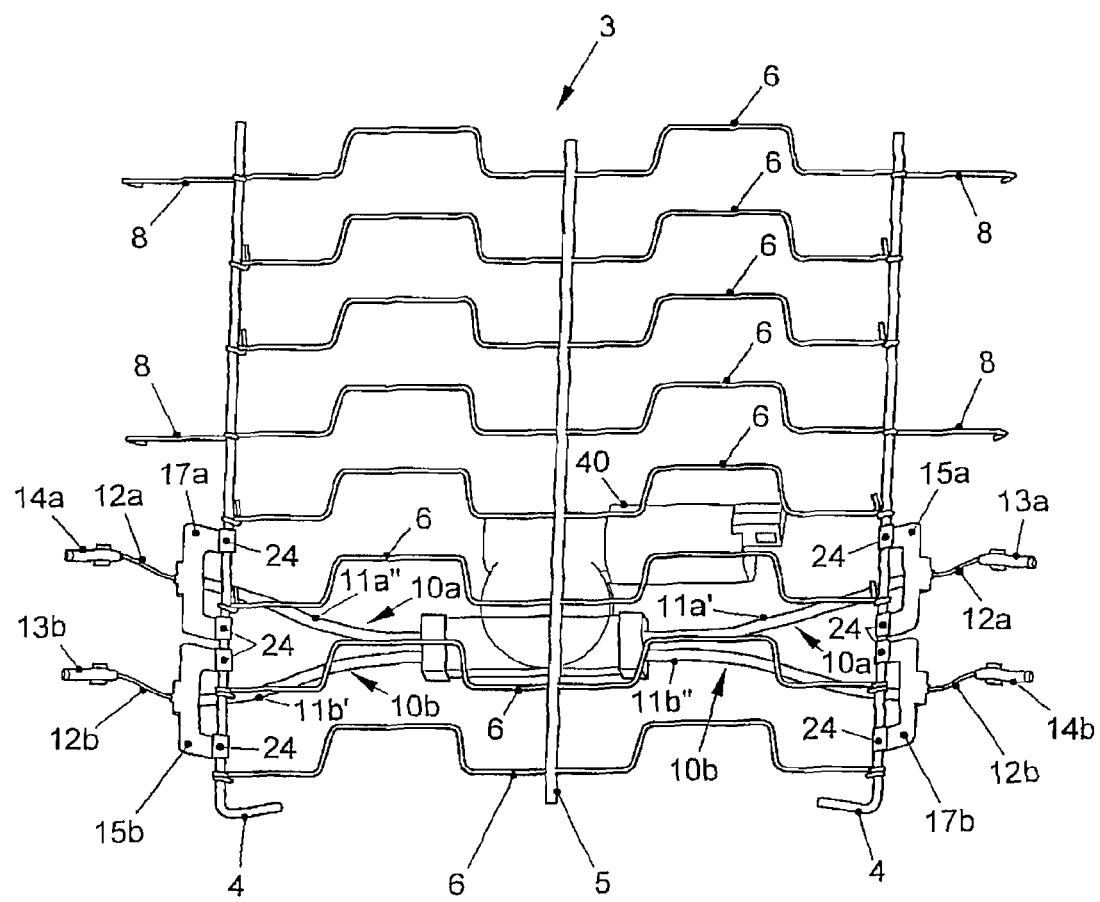
FIG. 7 shows a support assembly according to a fourth embodiment of the present invention, and FIG. 8 schematically illustrates an actuator as used in the embodiment of FIG. 7.

FIG. 7 shows a fourth embodiment of a support assembly according to the present invention. Components corresponding to those of the embodiment as shown in FIGS. 1-3 have been designated with the same reference numerals and further explanations thereof will be omitted. In the following, only the differences as compared to the support assembly of FIGS. 1-3 will be explained.

As in the embodiment of FIGS. 1-3, the support assembly of FIG. 7 has a first end portion 13a of the wire 12a of the first Bowden cable arrangement 10a extending from the first attachment means 15a. Similarly, the first end portion 13b of the wire 12b of the second Bowden cable arrangement 10b extends from the third attachment means 15b. However, from the first attachment means 15a, the first Bowden cable arrangement 10a extends to an actuator 40, and from the actuator 40 the first Bowden cable arrangement 10a extends to the second attachment means 17a. A second end portion 14a of the wire 12a of the first Bowden cable arrangement extends from the second attachment means 17a and is configured to be connected to the seat frame. Similarly, the second Bowden cable arrangement 10b extends from the third attachment means 15b to the actuator 40, and from the actuator 40 to the fourth attachment means 17b. A second end portion 14b of the wire 12b of the second Bowden cable arrangement 10b extends from the fourth attachment means 17b. The first end portions 13a, 13b and the second end portions 14a, 14b of the wires 12a, 12b are adapted to be connected to the seat frame by being provided with connecting means having the shape of a Z-nipple, as shown in FIG. 7.

The sheath 11a', 11a" of the first Bowden cable arrangement 10a has a first portion 11a' and a second portion 11a" which are separated from each other. The first portion 11a' of the sheath extends from the first attachment means 15a to the actuator 40. The second portion 11a" of the sheath extends from the actuator 40 to the second attachment means 17a. The wire 12a of the first Bowden cable arrangement 10a extends through the actuator 40.

Similarly, the sheath 11b', 11b" of the second Bowden cable arrangement 10b has a first portion 11b' and a second portion 11b" which are separated from each other. The first portion 11b' of the sheath extends from the third attachment means 15b to the actuator 40. The second portion 11b" of the sheath extends from the actuator 40 to the fourth attachment means 17b. The wire 12b of the second Bowden cable arrangement 10b extends through the actuator 40.

The actuator 40 is configured to simultaneously increase the tension in the first Bowden cable arrangement 10a and decrease the tension in the second Bowden cable arrangement 10b and vice versa.

Figure 8:
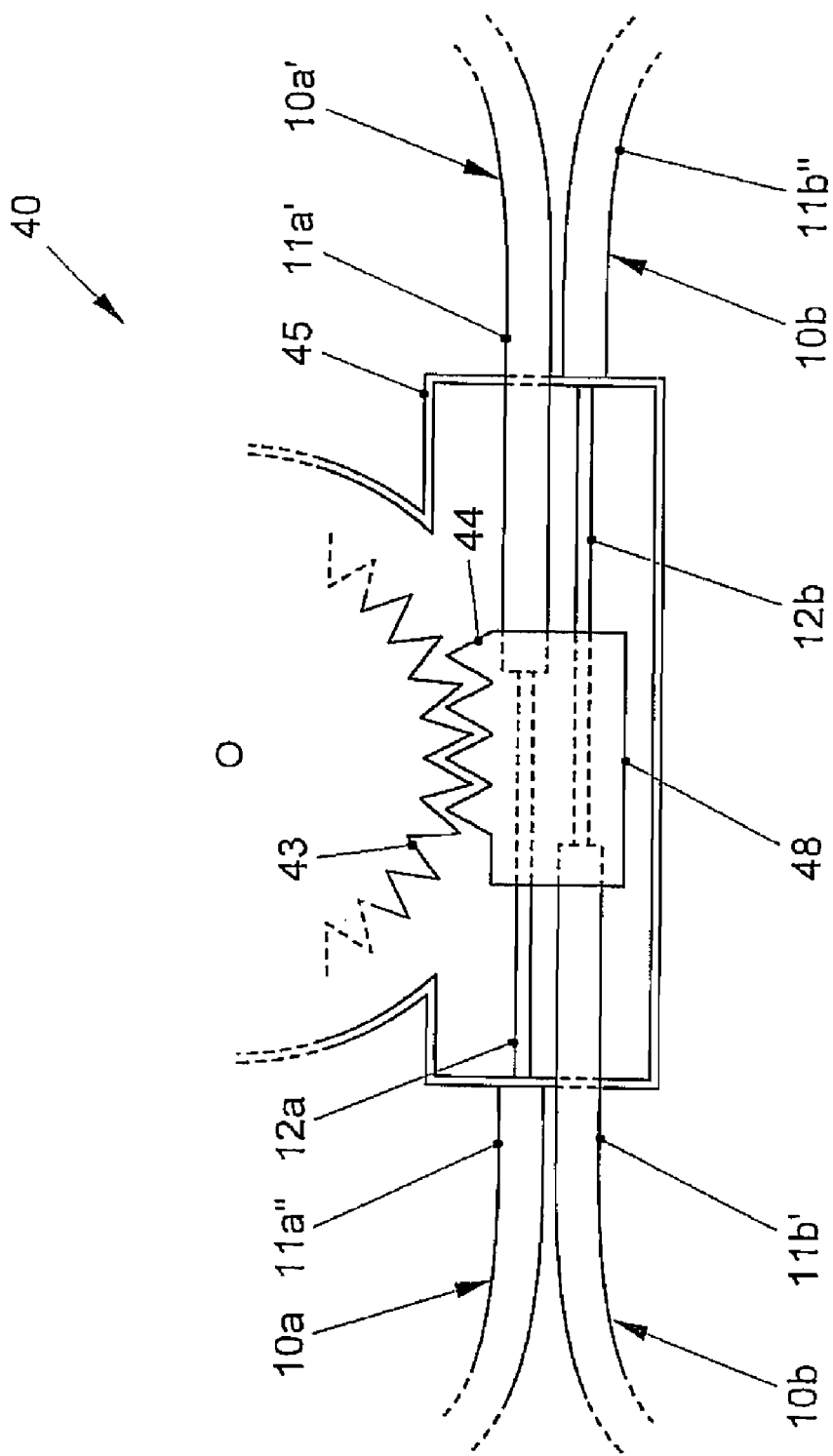

A preferred implementation of the actuator 40 is illustrated in FIG. 8. As illustrated in FIG. 8, the actuator 40 comprises a housing 45 which constitutes a fixed member and a slide member 48 which is slidable with respect to the housing 45. As illustrated, the first Bowden cable arrangement 10a and the second Bowden cable arrangement 10b extend through the actuator housing 45 along an essentially transversal direction, and the slide member 48 is slidable with respect to the housing 45 along this transversal direction.

The first portion 11a' of the sheath of the first Bowden cable arrangement 10a is connected to the slide member 48. The second portion 11a" of this sheath of the first Bowden cable arrangement 10a is connected to the housing 45. Similarly, the first portion 11b' of the sheath of the second Bowden cable arrangement 10b is connected to the slide member, while the second portion 11b" of the sheath of the second Bowden cable arrangement 10b is connected to the housing 45. Consequently, by moving the slide member 48 along the transversal direction, the distance between the first portion 11a' and the second portion 11a" of the sheath of the first Bowden cable arrangement 10a and the distance between the first portion 11b' and the second portion 11b" of the sheath of the second Bowden cable arrangement 10b are modified in opposite directions, thereby changing the tension. In particular, if the slide member 48 is moved to the right of FIG. 8, the tension in the first Bowden cable arrangement 10a is increased, and the tension in the second Bowden cable arrangement 10b is decreased. Conversely, when the slide member 48 is moved to the left, the tension in the first Bowden cable arrangement 10a is decreased and the tension in the second Bowden cable arrangement 10b is increased.

As further illustrated, the actuator 40 comprises means for moving the slide member 48 along a transversal direction. For this purpose, the actuator 40 comprises a toothed wheel 43 which is engaged with a toothed surface 44 of the slide member 48. The toothed wheel 43 is preferably driven by an electric motor (not illustrated in FIG. 8).

In the above-described embodiments the tension in the second Bowden cable arrangement 10b decreases when the tension in the first Bowden cable arrangement 10a increases and vice versa. Eventually, there may be no tension at all in one of the Bowden cable arrangements 10a, 10b. In this case, unsheathed portions of the wires 12a, 12b can more freely move and may come into contact with metallic surfaces of the seat structure. In order to avoid an undesirable generation of noise, it is therefore preferable to cover unsheathed portions of the wires 12a, 12b with a plastic material. Such unsheathed portions may in particular exist in the vicinity of the attachment means 15a, 17a, 15b, 17b, 16a, 16b. For the same reasons, it is preferable to cover the connecting means for connecting the end portions 13a, 13b, 14a, 14b of the wires 12a, 12b to the seat frame with a plastic material so as to avoid metal to metal contact.

Figure 9:
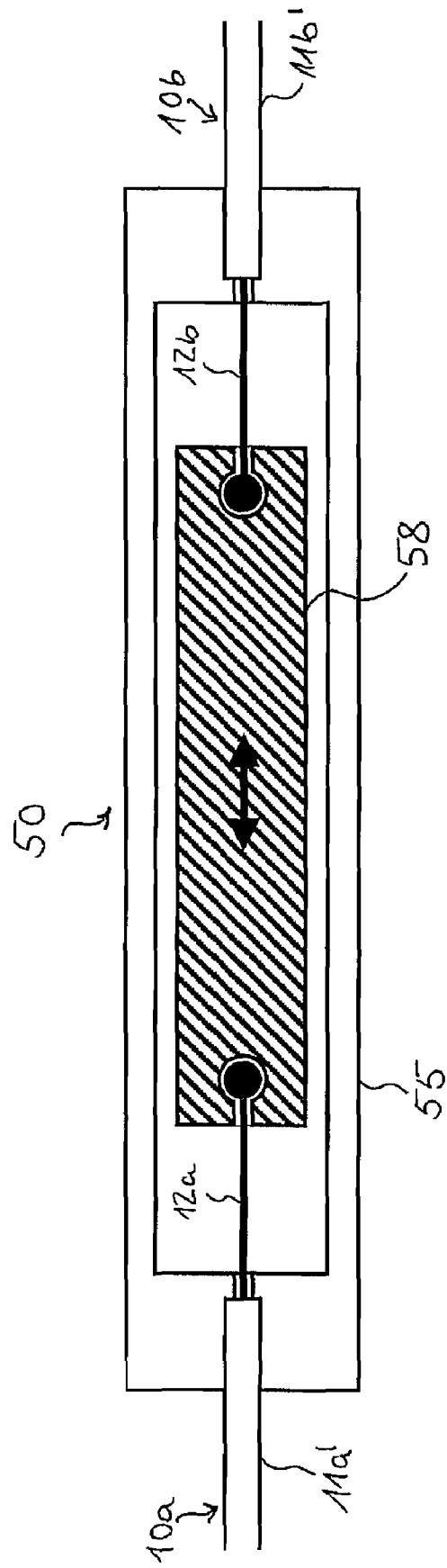
FIG. 9 schematically illustrates an actuator according to a further embodiment of the invention.

FIG. 9 schematically illustrates an actuator 50 according to a further embodiment of the invention. As illustrated in FIG. 9, the actuator 50 comprises a housing 55, which constitutes a fixed, and a slide member 58 which is slidable with respect to the housing 55. The first Bowden cable arrangement 10a and the second Bowden cable arrangement 10b are each coupled to the housing 55 at opposite ends thereof. The slide member 58 is slidable in a direction essentially extending between these two opposite ends of the housing 55.

As further illustrated, the sheaths 11a', 11b' of the Bowden cable arrangements 10a, 10b are each fixed to the housing 55, with the wires 12a, 12b extending into the housing 55. The ends the wires 12a, 12b are coupled to the slide member 58 at opposite ends thereof. Accordingly, by moving the slide member 58 in the sliding direction, as illustrated by the double-headed arrow, the tension in one of the Bowden cable arrangements 10a, 10b is decreased whereas the tension in the other Bowden cable arrangement is increased. Different mechanisms may be provided for moving the slide member 58 in the sliding direction, e.g. an electric motor, a toothed wheel, and a toothed surface, as explained in connection with FIG. 8.

As mentioned above, in the support assemblies as explained above, a situation may arise, in which there is no tension at all in one of the Bowden cable arrangements. Moreover, there may be a "pushing action" on the wire of one of the Bowden cable arrangements. In view of this situation, a support assembly according to a further embodiment of the invention additionally comprises a wire-length control mechanism configured to absorb an excessive length of the wire of the Bowden cable arrangement. The wire-length control mechanism may be provided in any of the above described embodiments, in either one of the Bowden cable arrangements or in both Bowden cable arrangements, as appropriate. By means of the wire-length control mechanism, an excessive length of the wire of the Bowden cable arrangement can be absorbed in a controlled way, thereby avoiding noise generation, uncontrolled movement of the wire, or even damaging of components.

Figure 10:
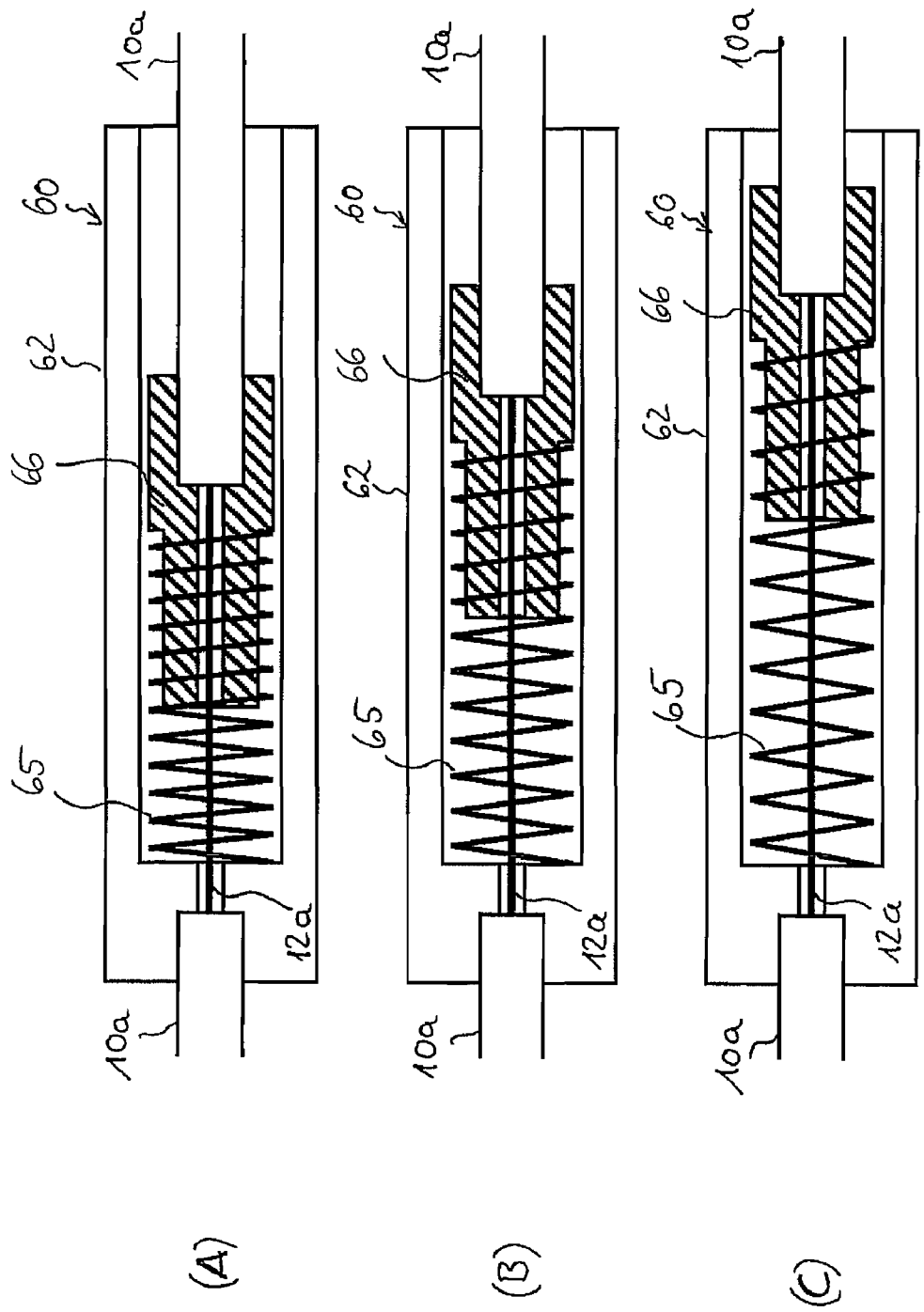
FIGS. 10(A), (B), and (C) schematically illustrate a wire-length control mechanism according to an embodiment of the invention.

In FIGS. 10(A), 10(B), and 10(C) a wire-length control mechanism 60 according to an embodiment of the invention is illustrated. The wire-length control mechanism 60 is illustrated as applied to the first Bowden cable arrangement 10a. However, it is to be understood that the wire-length control mechanism 60 could also be used with the second Bowden cable arrangement 10b.

As illustrated, the wire-length control mechanism 60 comprises a jacket or tubular housing 62 through which the wire 12a of the Bowden cable arrangement 10a extends. The sheath of the Bowden cable arrangement 10a is separated into two portions. The first portion is fixed to the jacket 62 at one end thereof, whereas the other portion of the sheath extends into the jacket 62 at the other end thereof and is slidable within the jacket 62. The second portion of the sheath is fixed to a slide member 66 received inside the jacket 62. An elastic member 65 is provided so as to bias the second portion of the sheath away from the first portion of the sheath. In the illustrated embodiment, the elastic member 65 is implemented as a spring arranged within the jacket 62 between the slide member 66 and an inner end surface of the jacket 62. In other embodiments, other types of elastic members may be provided. Further, it is to be understood that the slide member 66 could be omitted and the elastic member 65 could be coupled directly between the jacket 62 and the second portion of the sheath.

In the sequence of FIGS. 10(A), (B), and (C) the operation of the wire-length control mechanism is illustrated. In FIG. 10(A), the tension of the Bowden cable arrangement 10a pulls the second portion of the sheath and the slide member 66 into the jacket 62, against the biasing force of the elastic member 65. In FIG. 10(B) the tension is decreased as compared to the situation of FIG. 10(A). Accordingly, the second portion of the sheath and the slide member 66 move further away from the first portion of the sheath and the corresponding end of the jacket 62. In FIG. 10(C), the tension is even further decreased, thereby moving the second portion of the sheath and the slide member 66 even further away from the first portion of the sheath and the corresponding end of the jacket 62. As can be seen, even when the tension decreases, no slack of the wire 12a arises, and an excessive length of the wire 12a, which is not pulled into the sheath of the Bowden cable arrangement 10a, is absorbed within the jacket 62.

In FIGS. 11(A) and (B), a wire-length control mechanism according a further embodiment of the invention is illustrated. The wire-length control mechanism is implemented within an actuator 70, which may be similar to the actuator 50 of FIG. 9. Again, a slide member 78 is provided, which is slidable with respect to a housing of the actuator. The wire of the Bowden cable arrangement 10a is coupled to the slide member 78, and the sheath of the Bowden cable arrangement 10a is fixed to the housing.

As further illustrated, an outwardly curved guide surface 75 is provided for guiding the wire 12a along an arc of substantially 180°. The guide surface 75 may be provided with a groove for receiving the wire 12a and may be provided with a low-friction surface. In particular, the guide surface 75 may be formed of a suitable plastic material having low-friction characteristics with respect to the material of the wire 12a.

The operation of the wire-length control mechanism is illustrated in FIGS. 11(A) and (B). In FIG. 11(A), the tension in the Bowden cable arrangement 10a causes the wire 12a to be pulled against and along the guide surface 75. Accordingly, by moving the slide member 78 in the direction of the arrow in FIG. 11(A), the tension in the Bowden cable arrangement 10a can be further increased.

In FIG. 11(B), the tension in the Bowden cable arrangement 10a is decreased as compared to the situation of FIG. 11(A), by moving the slide member 78 in the direction of the arrow in FIG. 11(B). An excessive length of the wire 12a, which is not pulled into the sheath of the Bowden cable arrangement 10a, forms a loop outwardly extending from the guide surface 75. Accordingly, the excessive length of the wire 12a can be absorbed in a controlled way.

Figure 11:
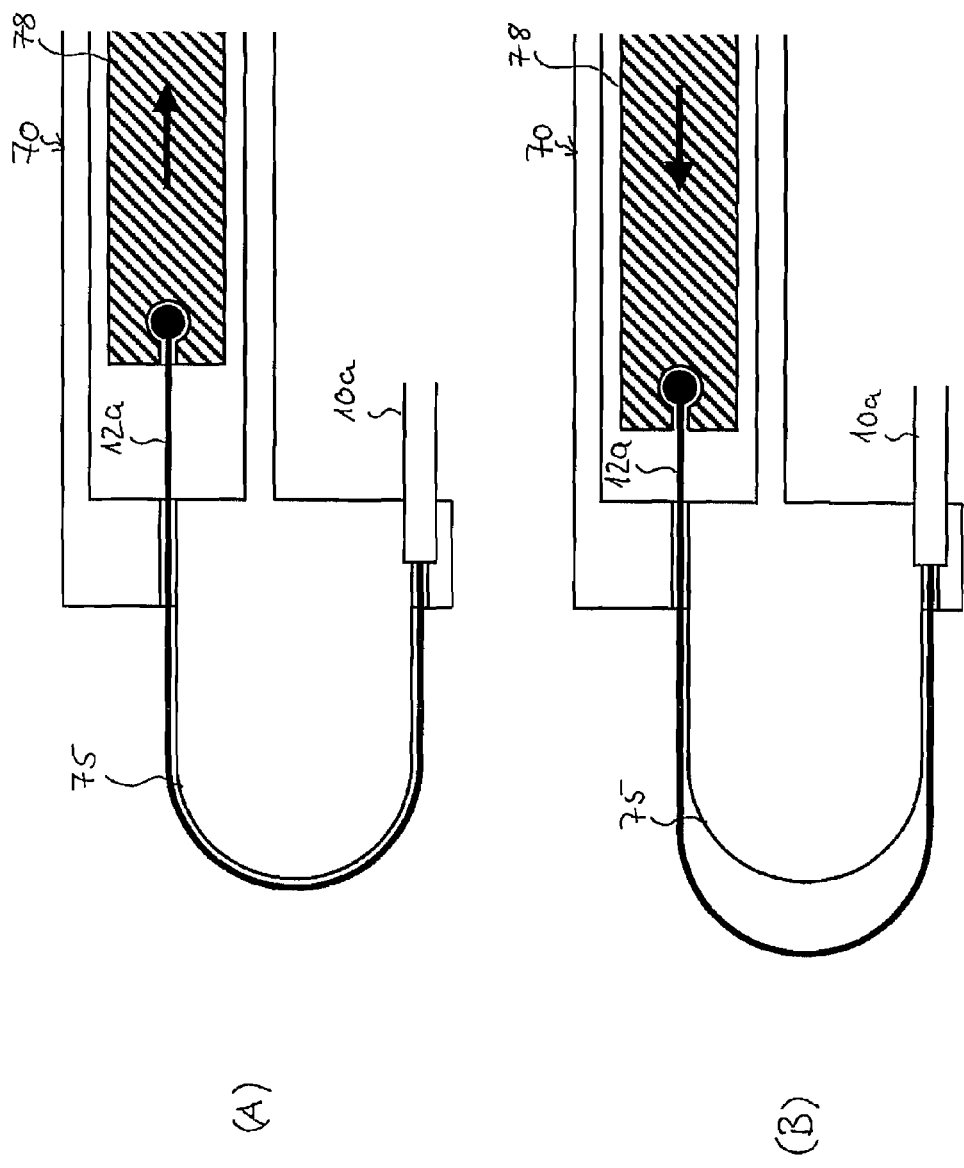
FIGS. 11(A) and (B) schematically illustrate a wire-length control mechanism according to a further embodiment of the invention.
Figure 12:
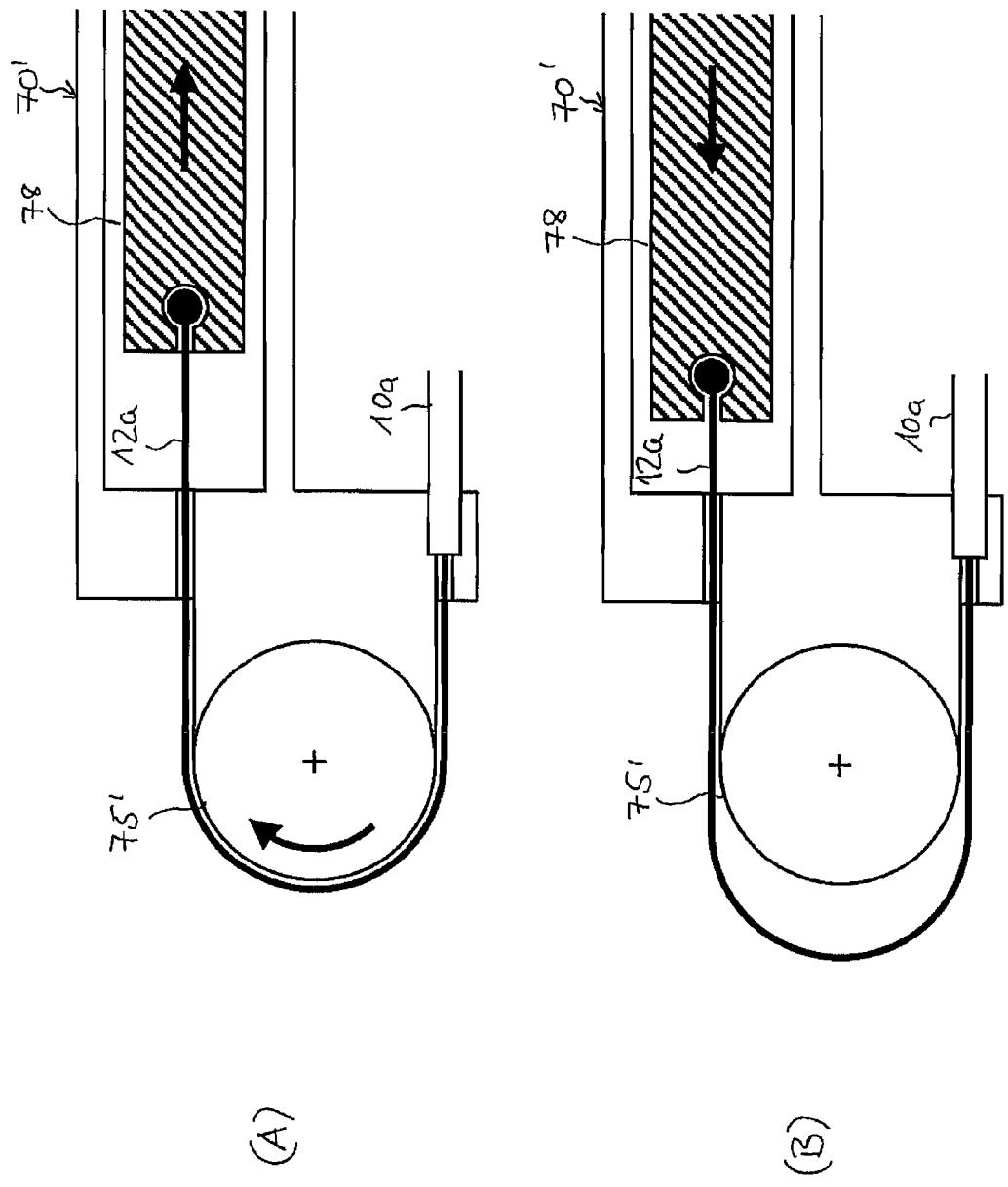
FIGS. 12(A) and (B) schematically illustrate a wire-length control mechanism according to a further embodiment of the invention.

FIG. 12 illustrates a wire-length control mechanism according to a further embodiment of the invention. The wire-length control mechanism of FIG. 12 generally corresponds to that of FIG. 11, and in the following only the differences as compared to the wire-length control mechanism of FIG. 11 will be explained. Again, the wire-length control mechanism is implemented within an actuator 70', which may be similar to the actuator 50 of FIG. 9.

In the wire-length control mechanism of FIG. 12, the guide surface 75 of FIG. 11 is replaced by a pulley 75'. The pulley 75' may be formed from a suitable plastic material and have a guide groove on the outer surface. By means of the pulley 75', the wire 12a is guided along an arc of substantially 180°. Movement of the wire 12a along this path is facilitated by rotation of the pulley, as illustrated by the arrow in FIG. 12(A).

The operation of the wire-length control mechanism in case of a lack of tension in the Bowden cable arrangement 10a is illustrated in FIGS. 12(A) and (B). Again, an excessive length of the wire 12a, which is not pulled into the sheath of the Bowden cable arrangement 10a, forms a loop extending outwardly from the pulley 75'. In this way, the excessive length of the wire 12a is absorbed in a controlled way.

Figure 13:
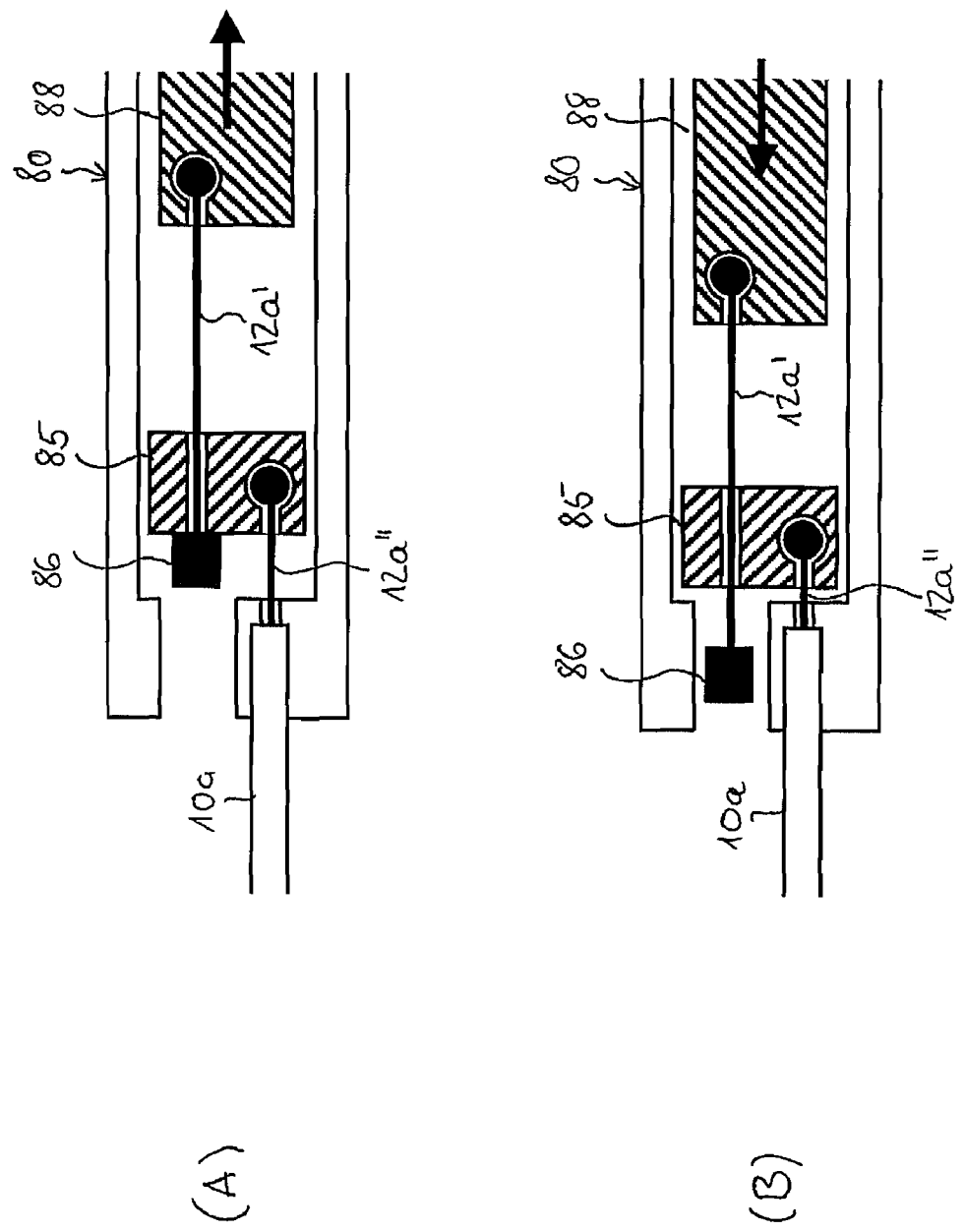
FIGS. 13(A) and (B) schematically illustrate a wire-length control mechanism according to a further embodiment of the invention.

In FIGS. 13(A) and (B), a wire-length control mechanism according to a further embodiment of the invention is illustrated. Again, the wire-length control mechanism is implemented within an actuator 80, which may be similar to the actuator 50 of FIG. 9.

The actuator 80 comprises a slide member 88 which is slidable with respect to a housing. The wire of the Bowden cable arrangement 10*a* is separated into a first portion 12*a*' and a second portion 12*a*". A further slide member 85 is provided, which is slidable in substantially the same direction as the slide member 88. The first portion of the wire 12*a*' is coupled to the slide member 88 and is slidably coupled to the further slide member 85, e.g. by being received within a channel of the further slide member. A sliding movement of the first portion of the wire 12*a*' with respect to the further slide member 85, when moving the slide member 88 and the further slide member 85 away from each other, is limited by a stop member 86. The second portion of the wire 12*a*" is coupled to the further slide member 85. The sheath of the Bowden cable arrangement 10*a* is fixed to the housing.

In FIG. 13(A), a situation is illustrated in which there is tension on the Bowden cable arrangement 10*a*. In this situation, the stop member 86 limits a further sliding movement of the first portion of the wire 12*a*' with respect to the further slide member 85, and a tractive force is transmitted from the slide member 88 to the further slide member 85 via the first portion of the wire 12*a*' when moving the slide member in the direction of the arrow in FIG. 13(A). From the further slide member 85, the tractive force is transmitted to the second portion of the wire 12*a*", thereby tensioning the Bowden cable arrangement 10*a*.

In FIG. 13(B), a situation is illustrated in which there is a lack of tension on the Bowden cable arrangement 10*a*. In this situation, the stop member 86 does not limit a sliding movement of the first portion of the wire 12*a* with respect to the further slide member 85, and the slide member 88 and the further slide member 85 are effectively decoupled from each other. If the slide member 88 moves in the direction of the arrow in FIG. 13(B), the first portion of the wire 12*a*' slides with respect to the further slide member 85, and the excessive wire length is absorbed in an outward direction. For this purpose, the housing may be provided with a guide channel for the stop member 86, as schematically illustrated in FIGS. 13(A) and (B).

As can be seen from FIGS. 13(A) and (B), an excessive wire length due to a lack of tension in the Bowden cable arrangement 10*a* is absorbed in a controlled way.

In FIGS. 14(A) and (B), a wire-length control mechanism according to a further embodiment of the invention is illustrated. Again, the wire-length control mechanism is implemented within an actuator 90, which may be similar to the actuator 50 of FIG. 9.

As illustrated in FIGS. 14(A) and (B), the actuator 90 comprises a slide member 98, which is slidable with respect to a housing. The wire 12*a* of the Bowden cable arrangement 10*a* is coupled to the slide member 98, and the sheath of the Bowden cable arrangement 10*a* is fixed to the housing.

As further illustrated, said coupling of the wire 12*a* to the slide member 98 is accomplished in a slidable manner, e.g. by receiving the wire 12*a* in a channel of the slide member 98. The sliding movement of the wire 12*a* away from the slide member 98 is limited by a stop member 96, In FIG. 14(A), a situation is illustrated in which there is tension on the Bowden cable arrangement 10*a*. In this situation, a sliding movement of the wire 12*a* with respect to the slide member 98 is limited by the stop member 96. Accordingly, when moving the slide member 98 in the direction indicated by the arrow in FIG. 14(A), a tractive force is transmitted to the wire 12*a*, thereby increasing the tension on the Bowden cable arrangement 10*a*.

In FIG. 14(B), a situation is illustrated in which there is a lack of tension on the Bowden cable arrangement 10*a*. In this case, the sliding movement of the wire 12*a* with respect to the slide member 98 in not limited by the stop member 96. In particular, when the slide member 98 is moved into the direction indicated by the arrow in FIG. 14(B), the wire 12*a* slides with respect to the slide member 98 and an excessive length of the wire 12*a*, which is not pulled into the sheath of the Bowden cable arrangement 10*a*, is effectively absorbed. As illustrated, the slide member 98 may be provided with an interior guide channel for the stop member 96. In this case, the excessive wire length is absorbed in a controlled way within the slide member 98.

Although the wire-length control mechanisms of FIGS. 11-14 each have been illustrated as being implemented within an actuator, it is to be understood that they could also be implemented as separate components, e.g. by indirectly coupling the illustrated slide members to the actuator via a Bowden cable arrangement. Further, it is to be understood that the illustrated wire-length control mechanisms may be provided for either one of the first Bowden cable arrangement and the second Bowden cable arrangement, or for both Bowden cable arrangements. Further, it is to be understood that the wire-length control mechanisms of FIGS. 10-14 could also be combined with each other, e.g. in order to increase the excessive wire length which can be absorbed.

Figure 15:
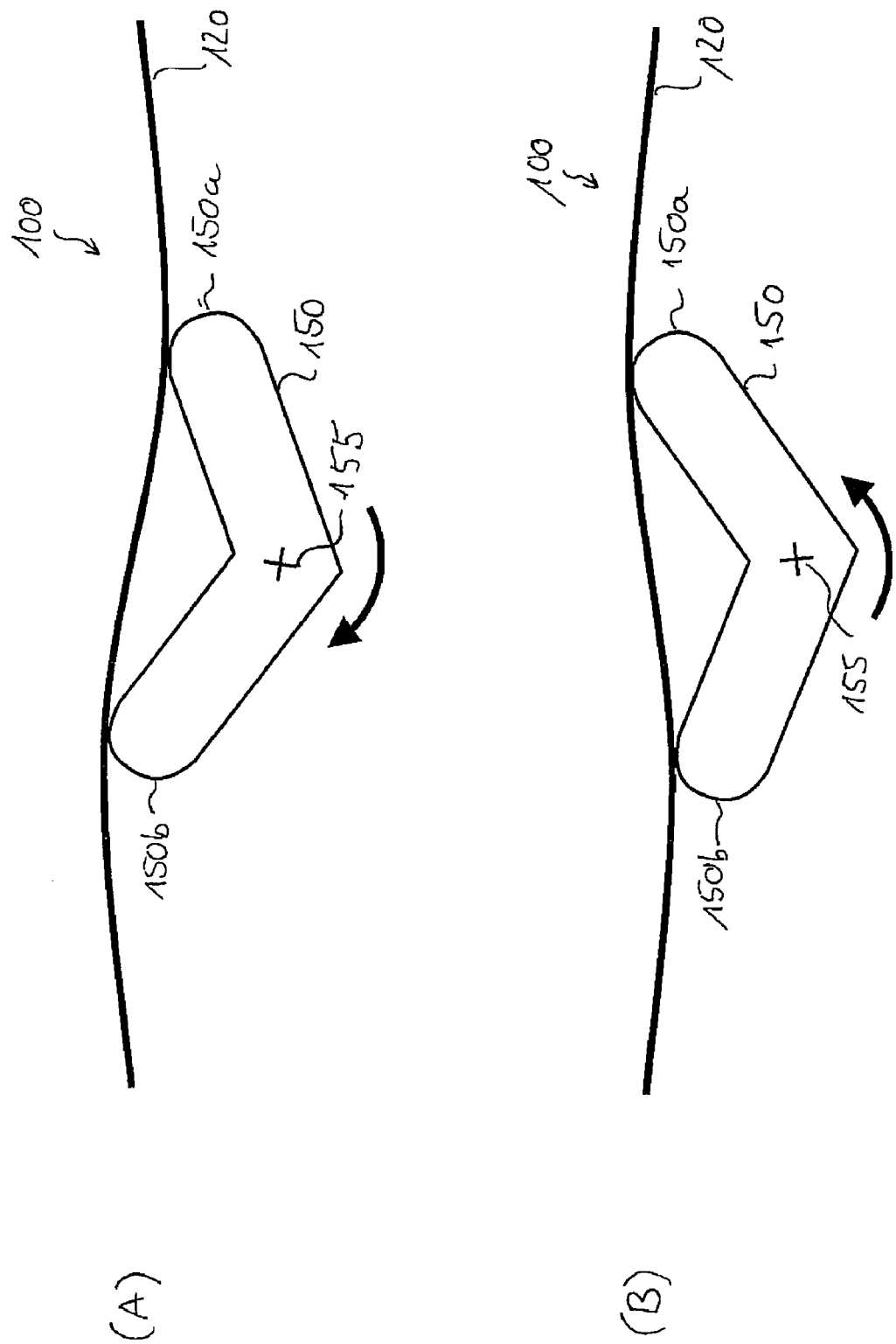
FIGS. 15(A) and (B) schematically illustrate a support assembly according a further embodiment of the invention.

FIGS. 15(A) and (B) schematically illustrate a support assembly 100 according to a further embodiment of the invention. In this case, an adjustment arrangement is provided which is based on a lever member 150, instead of using Bowden cable arrangements as in the previously described embodiments. A support member 120 of the support assembly 100 may be a flexible shield or plate or the like.

As illustrated, the lever member 150 comprises a first arm 150*a* and a second arm 150*b*. The first arm 150*a* acts on the support member 120 in a first support region, and the second arm 150*b* acts on the support member 120 in a second support region. For example, the arms 150*a*, 150*b* may each push against an elastic force arising from the elastic properties of the support member 120, thereby causing the support member 120 to deform.

The lever member 150 comprises a rotation axis 155 which is coupled to an actuator, e.g. an electric motor. By rotating the lever member 150 about the rotation axis 155, the forces acting on the support member 120 in one of the support regions increase, whereas the forces acting on the support member 120 in the other support region decrease. This is illustrated by FIGS. 15(A) and (B). In FIG. 15(A), the forces generated by the first arm 150*a* of the lever member 150 are smaller than the forces generated by the second arm 150*b* of the lever member 150, thereby obtaining an increased support in the second support region. As compared to that, in the situation of FIG. 15(B), the forces generated by the first arm 150*a* of the lever member 150 are larger than the forces generated by the second arm 150*b* of the lever member 150, thereby obtaining an increased support in the first support region. The corresponding rotation movements of the lever member 150 are illustrated by the arrows in FIGS. 15(A) and (B).

In FIGS. 16(A) and (B) a connecting structure of the wires 12*a*, 12*b* of the first and second Bowden cable arrangements 10*a*, 10*b* with respect to the seat frame 1 is illustrated. FIGS. 16(A) and (B) illustrate different perspective views of the connection structure. According to the illustrated embodiment, a connecting piece 200, which is formed from a plastic material, is attached to the seat frame 1. The connecting piece 200 comprises dedicated structures for receiving the ends of the wires 12*a*, 12*b*. As further illustrated, guide channels 240 are formed on the connecting piece 200 for guiding the wire 12a, 12b along an outer surface of the connecting piece 200. As illustrated, the guide channels 240 may be provided with a tapering shape, thereby increasing the flexibility with respect to different configurations of the support assembly, e.g. in different types of seats. The connecting piece 200 may be attached to the seat frame 1 by using a screwed connection through a hole 230. Other types of connection, e.g. clamping, gluing or the like, are also possible. Using the connection piece on the one hand facilitates installation of the support assembly with respect to the seat frame and increases the reliability of connection. On the other hand, the guide channels 240 have a similar effect as the guide surface 75 explained in connection with FIG. 10, e.g. an excessive length of the wires 12a, 12b may be absorbed in a controlled way by forming a loop extending from the outer surface of the connecting piece 200.

In FIGS. 16(A) and (B), a single connecting piece 200 for both wires 12a, 12b is illustrated. In other embodiments, a separate connecting piece may be provided for each of the wires 12a, 12b. The connecting piece 200 may be combined with the cable-length control mechanisms of FIGS. 10-14.

Although not explicitly shown in the drawings, it is also preferable to provide the actuators 30, 40, 50, 70, 70', 80, 90, of FIGS. 5, 8, and 9 with a self-blocking capability, e.g. by using a worm gear as in the actuator 20 of the first and second embodiments.

As explained above, the support assemblies as shown in FIGS. 1-4, 6, 7, and 15 allow for adjusting the degree of support in two different regions of a support assembly by means of a single actuator. Thereby, it is possible not only to adjust the degree of support in each of the regions, but also to select different heights for the support. The specific preferences with respect to the profile of the support can be met in a more accurate way. Further, it is possible to adapt the support assembly to differently sized users. At the same time, the structure of the support assembly is kept simple and only few components are required for the implementation.

What is claimed is:

1. A support assembly having a first support region with adjustable degree of support and a second support region with adjustable degree of support, comprising:
    a support member for incorporation into a seat frame,
    a first adjustment arrangement for adjusting the degree of support in the first support region, the first adjustment arrangement comprising a first Bowden cable arrangement,
    a second adjustment arrangement for adjusting the degree of support in the second support region, the second adjustment arrangement comprising a second Bowden cable arrangement, wherein the first Bowden cable arrangement and the second Bowden cable arrangement each comprise a wire guided in a sheath,
    first attachment means for attaching the sheath of the first Bowden cable arrangement to one side of the support member in the first support region,
    second attachment means for attaching the sheath of the first Bowden cable arrangement to the opposite side of the support member in the first support region,
    third attachment means for attaching the sheath of the second Bowden cable arrangement to one side of the support member in the second support region,
    fourth attachment means for attaching the sheath of the second Bowden cable arrangement to the opposite side of the support member in the second support region,
    an actuator coupled to the first adjustment arrangement and to the second adjustment arrangement,
    wherein the actuator is configured to simultaneously act on the first adjustment arrangement and on the second adjustment arrangement in opposite directions,
    wherein a first end portion of the wire of the first Bowden cable arrangement extends from the first attachment means and is adapted to be connected to the seat frame, and
    wherein a first end portion of the wire of the second Bowden cable arrangement extends from the third attachment means and is adapted to be connected to the seat frame.

2. The support assembly according to claim 1,
    wherein the first attachment means and the fourth attachment means are located on the same side of the support member and the second attachment means and the third attachment means are located on the same side of the support member.

3. The support assembly according to claim 2,
    wherein the support assembly comprises a member integrally forming the first attachment means and the fourth attachment means and/or a member integrally forming the second attachment means and the third attachment means.

4. The support assembly according to claim 2,
    wherein the sheaths of the first Bowden cable arrangement and of the second Bowden cable arrangement each comprise a first portion and a second portion which are separated from each other,
    wherein for the first Bowden cable arrangement the first portion of the sheath extends from the first attachment means to the actuator and the second portion of the sheath extends from the actuator to the second attachment means,
    wherein for the second Bowden cable arrangement the first portion of the sheath extends from the third attachment means to the actuator and the second portion of the sheath extends from the actuator to the fourth attachment means,
    wherein a second end portion of the wire of the first Bowden cable arrangement extends from the second attachment means, and
    wherein a second end portion of the wire of the second Bowden cable arrangement extends from the fourth attachment means.

5. The support assembly according to claim 4,
    wherein the actuator comprises a slide member which is slidably coupled to a fixed member of the actuator, the first portion of the sheath of the first Bowden cable arrangement and the first portion of the sheath of the second Bowden cable arrangement being coupled to the slide member and the second portion of the sheath of the first Bowden cable arrangement and the second portion of the sheath of the second Bowden cable arrangement being coupled to the fixed member.

6. The support assembly according to claim 5, wherein the actuator further comprises means for moving the slide member.

7. The support assembly according to claim 1,
    wherein the sheaths of the first Bowden cable arrangement and the second Bowden cable arrangement each comprise a first portion and a second portion which are separated from each other, wherein for the first Bowden cable arrangement the first portion of the sheath extends from the actuator to a first frame attachment means for attaching the first portion of the sheath to the seat frame and the second portion of the sheath extends from the first attachment means to the second attachment means, and wherein for the second Bowden cable arrangement the first portion of the sheath extends from the actuator to a second frame attachment means for attaching the first portion of the sheath to the seat frame and the second portion of the sheath extends from the third attachment means to the fourth attachment means.

8. The support assembly according to claim 7, wherein the first frame attachment means is integrally formed with a connecting means for connecting the first end portion of the wire of the second Bowden cable arrangement to the seat frame and/or the second frame attachment means is integrally formed with a connecting means for connecting the first end portion of the wire of the first Bowden cable arrangement to the seat frame.

9. The support assembly according to claim 1, comprising:

a connecting means for connecting a first end portion of the wire of the first Bowden cable arrangement to the seat frame and/or a connecting means for connecting a first end portion of the wire of the second Bowden cable arrangement to the seat frame, wherein the connecting means has a Z-shape.

10. The support assembly according to claim 1, comprising:

a connecting structure for connecting a first end portion of the wire of the first Bowden cable arrangement to the seat frame and/or a connecting structure for connecting a first end portion of the wire of the second Bowden cable arrangement to the seat frame, wherein the connecting structure comprises a plastic member configured to be attached to the seat frame.

11. The support assembly according to claim 1, wherein the actuator comprises winding means for winding a wire of the first Bowden cable arrangement and a wire of the second Bowden cable arrangement in opposite directions.

12. The support assembly according to claim 1, wherein the support member comprises two side members and a plurality of transverse members extending between the side members, and wherein the first attachment means, second attachment means, third attachment means, and fourth attachment means are configured to at least partly embrace the corresponding side member.

13. The support assembly according to claim 12, wherein the first attachment means, the second attachment means, the third attachment means, and the fourth attachment means have at least one clip portion for attachment to the respective side member.

14. The support assembly according to claim 1, comprising:

a lever member coupled to the actuator, wherein the lever member comprises a first arm acting on the support member in the first support region and a second arm acting on the support member in the second support region, and wherein the actuator is coupled to a rotation axis of the lever member.

15. The support assembly according to claim 1, wherein the actuator is provided with a self-blocking capability.

16. A support assembly having a first support region with adjustable degree of support and a second support region with adjustable degree of support, comprising:

a support member for incorporation into a seat frame, a first adjustment arrangement for adjusting the degree of support in the first support region, the first adjustment arrangement comprising a first Bowden cable arrangement, a second adjustment arrangement for adjusting the degree of support in the second support region, the second adjustment arrangement comprising a second Bowden cable arrangement, and an actuator coupled to the first adjustment arrangement and to the second adjustment arrangement, wherein the actuator is configured to simultaneously act on the first adjustment arrangement and on the second adjustment arrangement in opposite directions, and wherein an unsheathed portion of a wire of the first Bowden cable arrangement and/or an unsheathed portion of a wire of the second Bowden cable arrangement is covered with a plastic material.

17. A support assembly, having a first support region with adjustable degree of support and a second support region with adjustable degree of support, comprising:

a support member for incorporation into a seat frame, a first adjustment arrangement for adjusting the degree of support in the first support region, the first adjustment arrangement comprising a first Bowden cable arrangement, a second adjustment arrangement for adjusting the degree of support in the second support region, the second adjustment arrangement comprising a second Bowden cable arrangement, an actuator coupled to the first adjustment arrangement and to the second adjustment arrangement, wherein the actuator is configured to simultaneously act on the first adjustment arrangement and on the second adjustment arrangement in opposite directions, and a wire-length control mechanism coupled to the first Bowden cable arrangement and/or to the second Bowden cable arrangement, wherein the wire-length control mechanism is configured to absorb an excessive length of a wire of the Bowden cable arrangement.

18. The support assembly according to claim 17, wherein the wire-length control mechanism comprises a cylindrical jacket through which the wire of the Bowden cable arrangement is guided, wherein a first portion of the sheath of the Bowden cable arrangement is fixed to one end of the jacket and the second portion of the sheath of the Bowden cable arrangement is slidably received within the jacket, and wherein an elastic member is provided between the second portion of the sheath and the jacket so as to bias the second portion of the sheath away from the first portion of the sheath.

19. The support assembly according to claim 17, wherein the wire-length control mechanism comprises an outwardly curved guide surface configured to guide the wire of the Bowden cable arrangement.

20. The support assembly according to claim 17, wherein the wire-length control mechanism comprises a pulley configured to guide the wire of the Bowden cable arrangement.

21. The support assembly according to claim 17, wherein the wire-length control mechanism comprises a slide member which is slidably coupled to a fixed member, wherein the wire of the Bowden cable arrangement comprises a first portion and a second portion which are separated from each other, wherein the first portion of the wire is coupled to the actuator and slidably coupled to the slide member, wherein the second portion of the wire is coupled to the slide member, and wherein a sliding movement of the first portion of the wire with respect to the slide member is limited by a stop member.

22. The support assembly according to claim 17, wherein the wire-length control mechanism comprises a slide member which is slidably coupled to a fixed member wherein the wire of the Bowden cable arrangement is slidably coupled to the slide member, and wherein a sliding movement of the wire with respect to the slide member is limited in one direction by a stop member.

* * * * *